United States Patent
Kim et al.

(10) Patent No.: US 7,435,200 B2
(45) Date of Patent: Oct. 14, 2008

(54) HYDRAULIC PRESSURE CONTROL APPARATUS OF BELT-DRIVE CONTINUOUSLY VARIABLE TRANSMISSION FOR AUTOMOTIVE VEHICLE

(75) Inventors: Jonggap Kim, Shizuoka (JP); Seiichiro Takahashi, Shizuoka (JP); Yasushi Yabe, Shizuoka (JP)

(73) Assignee: Jatco Ltd, Shizuoka (JP)

( * ) Notice: Subject to any disclaimer, the term of this patent is extended or adjusted under 35 U.S.C. 154(b) by 637 days.

(21) Appl. No.: 11/185,735

(22) Filed: Jul. 21, 2005

(65) Prior Publication Data

US 2006/0058129 A1    Mar. 16, 2006

(30) Foreign Application Priority Data

Aug. 2, 2004    (JP) .............................. 2004-225965

(51) Int. Cl.
*F16H 61/662* (2006.01)
*F16H 61/00* (2006.01)
*B60W 10/04* (2006.01)

(52) U.S. Cl. ............................ 477/46; 477/45; 477/115
(58) Field of Classification Search .................. 477/37, 477/44, 45, 46, 50, 115
See application file for complete search history.

(56) References Cited

U.S. PATENT DOCUMENTS 7,229,372 B2 *   6/2007   Shimanaka et al. ........... 474/28
7,384,372 B2 *   6/2008   Katou .......................... 477/46

FOREIGN PATENT DOCUMENTS

JP            405141515 A *   6/1993   .................. 477/46
JP            2001-173770 A   6/2001

* cited by examiner

*Primary Examiner*—Roger Pang
(74) *Attorney, Agent, or Firm*—Foley & Lardner LLP

(57) ABSTRACT

A hydraulic pressure control apparatus of a belt-drive continuously variable transmission (CVT) for an automotive vehicle, includes a vehicular information detector that detects engine-and-vehicle operating conditions and a hydraulic actuator that regulates primary and secondary pulley pressures. A CVT control unit calculates a primary-pulley slip-limit pulley thrust and a secondary-pulley slip-limit pulley thrust based on information about the engine-and-vehicle operating conditions. The CVT control unit sets a primary-pulley-thrust command value to the primary-pulley slip-limit pulley thrust and calculates a desired secondary pulley thrust based on a desired transmission ratio, when a pulley ratio is greater than or equal to 1. The CVT control unit sets a secondary-pulley-thrust command value to the secondary-pulley slip-limit pulley thrust and calculates a desired primary pulley thrust suited to the desired transmission ratio, when the pulley ratio is less than 1.

15 Claims, 8 Drawing Sheets

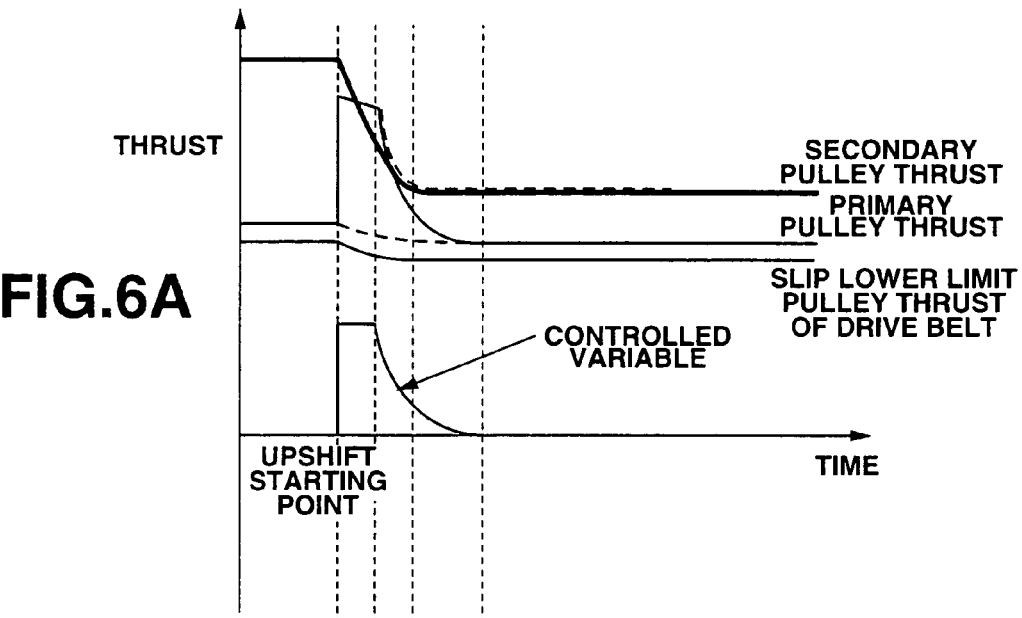
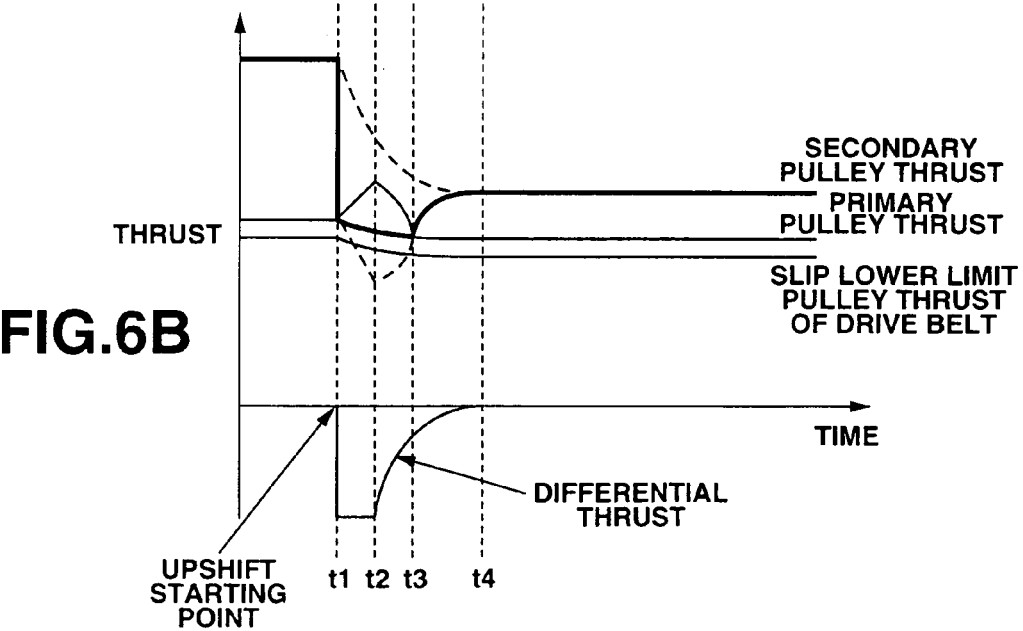

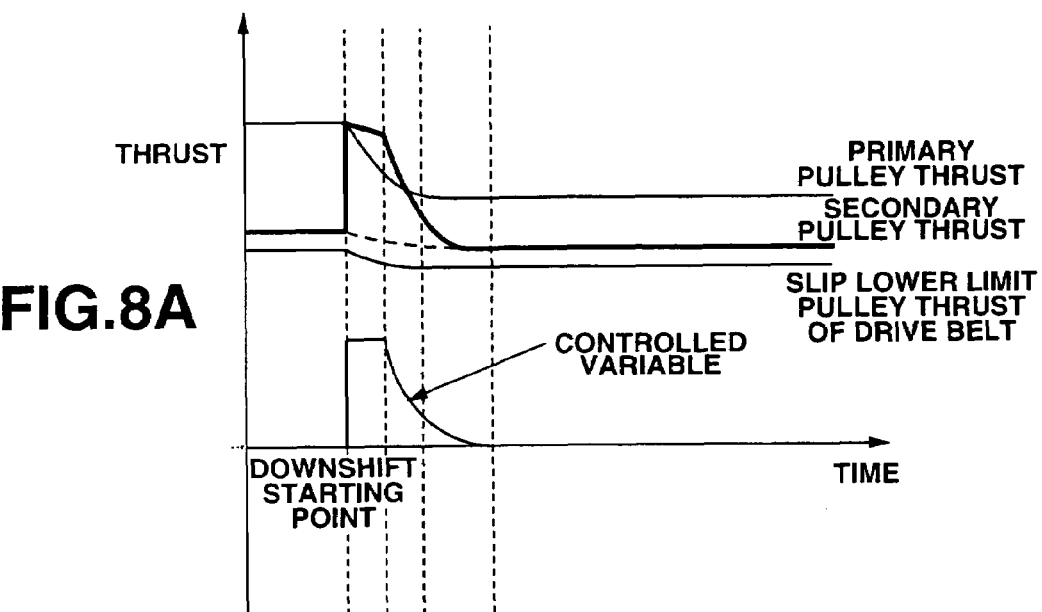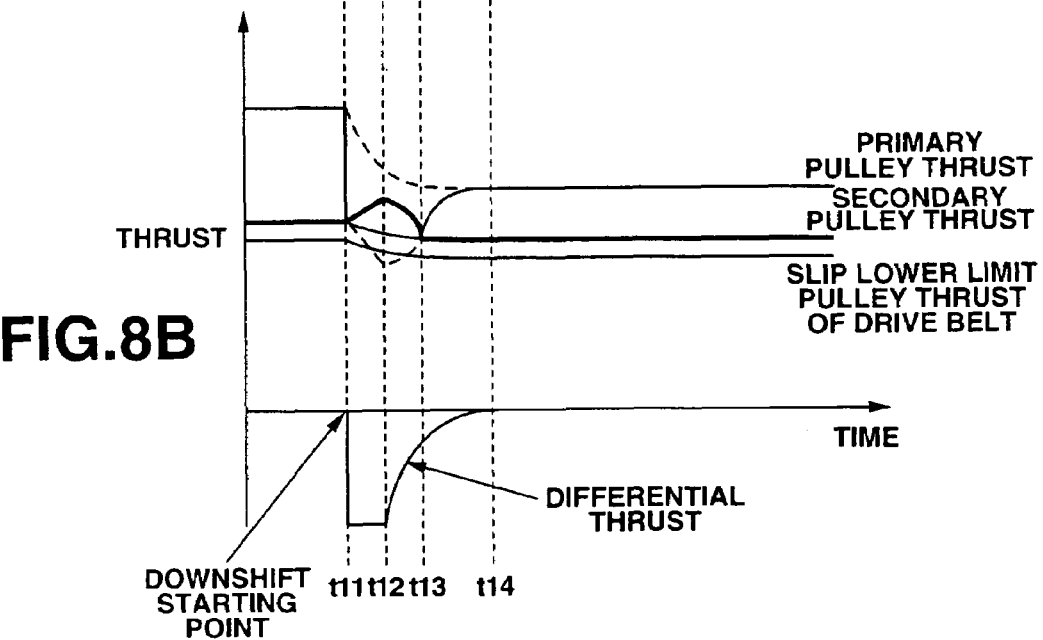

HYDRAULIC PRESSURE CONTROL APPARATUS OF BELT-DRIVE CONTINUOUSLY VARIABLE TRANSMISSION FOR AUTOMOTIVE VEHICLE

TECHNICAL FIELD

The present invention relates to a hydraulic pressure control apparatus of a belt-drive continuously variable transmission (belt-drive CVT) for an automotive vehicle employing an electronically-controlled hydraulic actuator, and specifically to the improvement of a pulley thrust control technology for an automotive belt-drive continuously variable transmission employing a primary variable-width input pulley, and a secondary variable-width output pulley, and a drive belt running in the primary and secondary pulleys.

BACKGROUND ART

In recent years, there have been proposed and developed various pulley thrust control technologies for belt-drive continuously variable transmissions (CVTs), which enable an actual transmission ratio to be steplessly adjusted or feedback-controlled toward a desired transmission ratio. As is generally known, a belt-drive CVT uses a drive belt (usually, a single segmented steel belt) running in primary and secondary variable-width pulleys whose V grooves are aligned with each other, to provide varying gear ratios or pulley ratios. In more detail, the V groove of the primary pulley, to which input rotation is transmitted from an engine, is constructed by a stationary flange and an adjustable flange axially slidable for varying the width of the V groove of the primary pulley by way of a primary pulley thrust resulting from a "primary pulley pressure". The V groove of the secondary pulley, which is connected via a gear train to drive wheels, is constructed by a stationary flange and an adjustable flange for varying the width of the V groove of the secondary pulley by way of a secondary pulley thrust resulting from a "secondary pulley pressure". Actually, the adjustable flange of the primary pulley is forced toward the associated stationary flange by the primary pulley pressure, and simultaneously the adjustable flange of the secondary pulley is forced toward the associated stationary flange by the secondary pulley pressure. This enables power transmission between the primary and secondary pulleys via the drive belt, while keeping the drive belt in friction-contact with the V grooves of the primary and secondary pulleys. During the power transmission, assuming that the frictional force between the variable-width pulley and the drive belt is less than a belt driving force, a belt slippage occurs. This deteriorates the durability of the belt-drive CVT. To avoid such a belt slippage, a lower limit (or a lower limit guard) of the pulley thrust of each of the primary and secondary pulleys is set. However, when the pulley thrust of either one of the primary and secondary pulleys must be reduced during a shift, the lower limit guard undesirably acts to disturb an adequate drop in pulley thrust. This deteriorates a gear shift responsiveness. To avoid this, the pulley thrust of the other pulley is increasingly compensated for to ensure the permissible gear shift responsiveness. Increasing the pulley thrust of the other pulley means an increase in engine load, thus deteriorating fuel economy. To balance contradictory requirements, that is, a reduced fuel consumption (improved fuel economy) and a permissible gear shift responsiveness, in particular, an adequate transient gear shift responsiveness, Japanese Patent Provisional Publication No. 2001-173770 (hereinafter is referred to as "JP2001-173770") teaches (i) setting a lower limit guard for each of pulley thrusts of primary and secondary pulleys, (ii) calculating a pulley thrust of a lower-thrust pulley of the two pulleys so that a radius of rotation of the drive belt of the lower-thrust pulley side, in other words, half of the effective diameter of the lower-thrust pulley, is brought closer to a radius corresponding to a desired transmission ratio or a desired pulley ratio, and (iii) holding the calculated pulley thrust of the lower-thrust pulley at the lower limit guard when the calculated pulley thrust of the lower-thrust pulley becomes below the lower limit guard. JP2001-173770 also teaches (iv) calculating a difference between the calculated pulley thrust and the lower limit guard and (v) adding the calculated difference to a pulley-thrust command value of the higher-thrust pulley, in order to avoid the transient shifting responsiveness from deteriorating owing to a decrease in the time rate of change in the radius of rotation of the drive belt of the lower-thrust pulley, arising from holding the calculated pulley thrust at the lower limit guard of the lower-thrust pulley (see the difference and the additional value shown in FIGS. 5A and 7A). This balances two contradictory requirements, that is, the drive-belt slippage prevention and better shifting response.

SUMMARY OF THE INVENTION

However, in the CVT control device as disclosed in JP2001-173770, suppose that an upshift is made within a range of an actual transmission ratio (pulley ratio) ip higher than or equal to "1". As can be appreciated from the one-dotted line of FIG. 5A showing the pulley ratio versus primary pulley thrust characteristic and the solid line of FIG. 5A showing the pulley ratio versus secondary pulley thrust characteristic, a pulley-thrust command value of the secondary pulley keeping the relatively higher thrust remains high, while a pulley-thrust command value of the primary pulley keeping the relatively lower thrust is temporarily built up (see the area indicated by the plus (+) sign in FIG. 5A) during the upshift. As a whole, the CVT control device as disclosed in JP2001-173770 requires high hydraulic pressure. Conversely, suppose that a downshift is made within a range of pulley ratio ip less than "1". As can be appreciated from the one-dotted line of FIG. 7A showing the pulley ratio versus primary pulley thrust characteristic and the solid line of FIG. 7A showing the pulley ratio versus secondary pulley thrust characteristic, a pulley-thrust command value of the primary pulley keeping the relatively higher thrust remains high, while a pulley-thrust command value of the secondary pulley keeping the relatively lower thrust is temporarily built up (see the area indicated by the plus (+) sign in FIG. 7A) during the downshift. As a whole, the CVT control device as disclosed in JP2001-173770 requires high hydraulic pressure.

Accordingly, it is an object of the invention to provide a hydraulic pressure control apparatus of a belt-drive continuously variable transmission for an automotive vehicle, which is capable of balancing two contradictory requirements, namely improved fuel economy and enhanced gear shift responsiveness.

In order to accomplish the aforementioned and other objects of the present invention, a hydraulic pressure control apparatus of a belt-drive continuously variable transmission for an automotive vehicle, which employs a primary variable-width pulley of a driving pulley side, a secondary variable-width pulley of a driven pulley side, and a drive belt running in the primary and secondary pulleys, and whose shift is made by changing a radius of a contact circle of the drive belt of the driving pulley side and a radius of a contact circle of the drive belt of the driven pulley side by a primary pulley thrust, created by at least a primary pulley pressure applied to an adjustable flange of the primary pulley, and a secondary pulley thrust, created by at least a secondary pulley pressure applied to an adjustable flange of the secondary pulley, comprises a vehicular information detector that detects engine-and-vehicle operating conditions, a hydraulic actuator that regulates the primary and secondary pulley pressures, and a control unit being configured to be electrically connected to the vehicular information detector and the hydraulic actuator, for calculating a command value of the primary pulley thrust and a command value of the secondary pulley thrust based on information about the engine-and-vehicle operating conditions, and for automatically controlling the hydraulic actuator responsively to the primary-pulley-thrust command value and the secondary-pulley-thrust command value, the control unit comprising a processor programmed to perform the following, calculating a desired transmission ratio based on the information about the engine-and-vehicle operating conditions, calculating a primary-pulley slip-limit pulley thrust, which is defined as a lower limit of the primary pulley thrust enabling torque transmission between the primary and secondary pulleys without slippage of the drive belt, and a secondary-pulley slip-limit pulley thrust, which is defined as a lower limit of the secondary pulley thrust enabling torque transmission between the primary and secondary pulleys without slippage of the drive belt, based on the information about the engine-and-vehicle operating conditions, setting the primary-pulley-thrust command value to the primary-pulley slip-limit pulley thrust and calculating a desired secondary pulley thrust based on the desired transmission ratio, when a pulley ratio of the primary and secondary pulleys is greater than or equal to 1, and setting the secondary-pulley-thrust command value to the secondary-pulley slip-limit pulley thrust and calculating a desired primary pulley thrust based on the desired transmission ratio, when the pulley ratio is less than 1.

According to another aspect of the invention, a hydraulic pressure control apparatus of a belt-drive continuously variable transmission for an automotive vehicle, which employs a primary variable-width pulley of a driving pulley side, a secondary variable-width pulley of a driven pulley side, and a drive belt running in the primary and secondary pulleys, and whose shift is made by changing a radius of a contact circle of the drive belt of the driving pulley side and a radius of a contact circle of the drive belt of the driven pulley side by a primary pulley thrust, created by at least a primary pulley pressure applied to an adjustable flange of the primary pulley, and a secondary pulley thrust, created by at least a secondary pulley pressure applied to an adjustable flange of the secondary pulley, comprises a vehicular information detector that detects engine-and-vehicle operating conditions, a hydraulic actuator that regulates the primary and secondary pulley pressures, and a control unit being configured to be electrically connected to the vehicular information detector and the hydraulic actuator, for calculating a command value of the primary pulley thrust and a command value of the secondary pulley thrust based on information about the engine-and-vehicle operating conditions, and for automatically controlling the hydraulic actuator responsively to the primary-pulley-thrust command value and the secondary-pulley-thrust command value, the control unit comprising a processor programmed to perform the following, calculating a desired transmission ratio based on the information about the engine-and-vehicle operating conditions, calculating a primary-pulley slip-limit pulley thrust, which is defined as a lower limit of the primary pulley thrust enabling torque transmission between the primary and secondary pulleys without slippage of the drive belt, and a secondary-pulley slip-limit pulley thrust, which is defined as a lower limit of the secondary pulley thrust enabling torque transmission between the primary and secondary pulleys without slippage of the drive belt, based on the information about the engine-and-vehicle operating conditions, calculating a desired secondary pulley thrust based on the desired transmission ratio within a transmission ratio range greater than or equal to 1, and setting a sum of the primary-pulley slip-limit pulley thrust and a difference between the secondary-pulley slip-limit pulley thrust and the desired secondary pulley thrust to the primary-pulley-thrust command value, and additionally setting the secondary-pulley slip-limit pulley thrust to the secondary-pulley-thrust command value, when the desired secondary pulley thrust is less than the secondary-pulley slip-limit pulley thrust during an upshift within the transmission ratio range greater than or equal to 1, and calculating a desired primary pulley thrust based on the desired transmission ratio within the transmission ratio range less than 1, and setting a sum of the secondary-pulley slip-limit pulley thrust and a difference between the primary-pulley slip-limit pulley thrust and the desired primary pulley thrust to the secondary-pulley-thrust command value, and additionally setting the primary-pulley slip-limit pulley thrust to the primary-pulley-thrust command value, when the desired primary pulley thrust is less than the primary-pulley slip-limit pulley thrust during a downshift within the transmission ratio range less than 1.

According to a further aspect of the invention, a method of controlling a belt-drive continuously variable transmission for an automotive vehicle, which employs a primary variable-width pulley of a driving pulley side, a secondary variable-width pulley of a driven pulley side, and a drive belt running in the primary and secondary pulleys, and whose shift is made by changing a radius of a contact circle of the drive belt of the driving pulley side and a radius of a contact circle of the drive belt of the driven pulley side by a primary pulley thrust, created by at least a primary pulley pressure applied to an adjustable flange of the primary pulley, and a secondary pulley thrust, created by at least a secondary pulley pressure applied to an adjustable flange of the secondary pulley, the method comprises detecting engine-and-vehicle operating conditions, calculating a command value of the primary pulley thrust and a command value of the secondary pulley thrust based on information about the engine-and-vehicle operating conditions, automatically regulating the primary and secondary pulley pressures responsively to the primary-pulley-thrust command value and the secondary-pulley-thrust command value, calculating a desired transmission ratio based on the information about the engine-and-vehicle operating conditions, calculating a primary-pulley slip-limit pulley thrust, which is defined as a lower limit of the primary pulley thrust enabling torque transmission between the primary and secondary pulleys without slippage of the drive belt, and a secondary-pulley slip-limit pulley thrust, which is defined as a lower limit of the secondary pulley thrust enabling torque transmission between the primary and secondary pulleys without slippage of the drive belt, based on the information about the engine-and-vehicle operating conditions, setting the primary-pulley-thrust command value to the primary-pulley slip-limit pulley thrust and calculating a desired secondary pulley thrust based on the desired transmission ratio, when a pulley ratio of the primary and secondary pulleys is greater than or equal to 1, and setting the secondary-pulley-thrust command value to the secondary-pulley slip-limit pulley thrust and calculating a desired primary pulley thrust based on the desired transmission ratio, when the pulley ratio is less than 1.

According to a still further aspect of the invention, a method of controlling a belt-drive continuously variable transmission for an automotive vehicle, which employs a primary variable-width pulley of a driving pulley side, a secondary variable-width pulley of a driven pulley side, and a drive belt running in the primary and secondary pulleys, and whose shift is made by changing a radius of a contact circle of the drive belt of the driving pulley side and a radius of a contact circle of the drive belt of the driven pulley side by a primary pulley thrust, created by at least a primary pulley pressure applied to an adjustable flange of the primary pulley, and a secondary pulley thrust, created by at least a secondary pulley pressure applied to an adjustable flange of the secondary pulley, the method comprises detecting engine-and-vehicle operating conditions, calculating a command value of the primary pulley thrust and a command value of the secondary pulley thrust based on information about the engine-and-vehicle operating conditions, automatically regulating the primary and secondary pulley pressures responsively to the primary-pulley-thrust command value and the secondary-pulley-thrust command value, calculating a desired transmission ratio based on the information about the engine-and-vehicle operating conditions, calculating a primary-pulley slip-limit pulley thrust, which is defined as a lower limit of the primary pulley thrust enabling torque transmission between the primary and secondary pulleys without slippage of the drive belt, and a secondary-pulley slip-limit pulley thrust, which is defined as a lower limit of the secondary pulley thrust enabling torque transmission between the primary and secondary pulleys without slippage of the drive belt, based on the information about the engine-and-vehicle operating conditions, calculating a desired secondary pulley thrust based on the desired transmission ratio within a transmission ratio range greater than or equal to 1, and setting a sum of the primary-pulley slip-limit pulley thrust and a difference between the secondary-pulley slip-limit pulley thrust and the desired secondary pulley thrust to the primary-pulley-thrust command value, and additionally setting the secondary-pulley slip-limit pulley thrust to the secondary-pulley-thrust command value, when the desired secondary pulley thrust is less than the secondary-pulley slip-limit pulley thrust during an upshift within the transmission ratio range greater than or equal to 1, and calculating a desired primary pulley thrust based on the desired transmission ratio within the transmission ratio range less than 1, and setting a sum of the secondary-pulley slip-limit pulley thrust and a difference between the primary-pulley slip-limit pulley thrust and the desired primary pulley thrust to the secondary-pulley-thrust command value, and additionally setting the primary-pulley slip-limit pulley thrust to the primary-pulley-thrust command value, when the desired primary pulley thrust is less than the primary-pulley slip-limit pulley thrust during a downshift within the transmission ratio range less than 1.

The other objects and features of this invention will become understood from the following description with reference to the accompanying drawings.

BRIEF DESCRIPTION OF THE DRAWINGS

FIG. 6A is a time chart showing variations in each of primary and secondary pulley thrusts based on the pulley thrust control executed by the earlier CVT hydraulic pressure control apparatus during the upshift within the pulley-ratio range higher than or equal to "1".

FIG. 6B is a time chart showing variations in each of primary and secondary pulley thrusts based on the pulley thrust control executed by the CVT hydraulic pressure control apparatus of the embodiment during the upshift within the pulley-ratio range higher than or equal to "1".

FIG. 8A is a time chart showing variations in each of primary and secondary pulley thrusts based on the pulley thrust control executed by the earlier CVT hydraulic pressure control apparatus during the downshift within the pulley-ratio range less than "1".

FIG. 8B is a time chart showing variations in each of primary and secondary pulley thrusts based on the pulley thrust control executed by the CVT hydraulic pressure control apparatus of the embodiment during the downshift within the pulley-ratio range less than "1".

DESCRIPTION OF THE PREFERRED EMBODIMENTS

Figure 1:
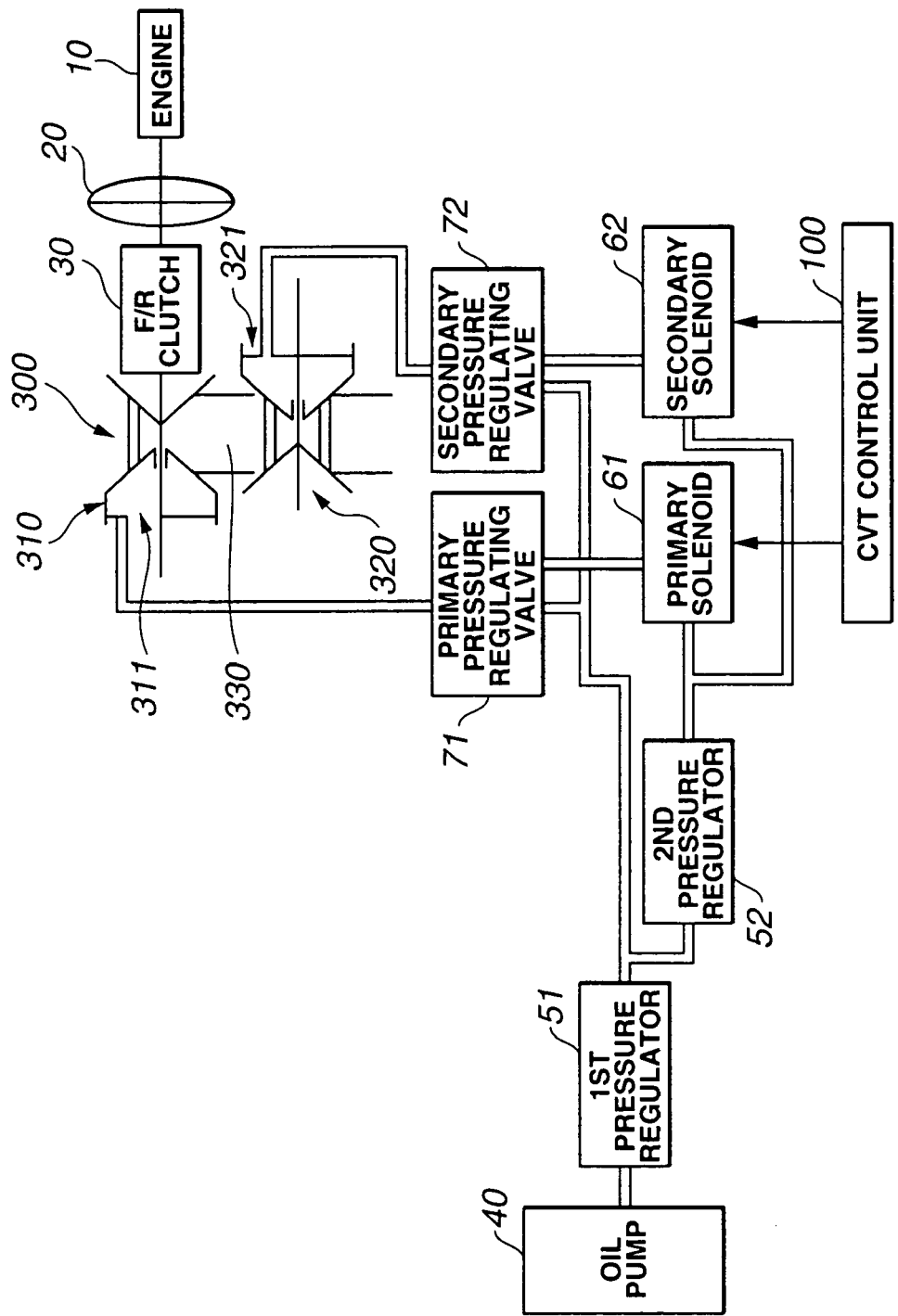
FIG. 1 is a system diagram of an embodiment illustrating part of a power train and a CVT control system of an automotive vehicle employing a hydraulic pressure control apparatus of a belt-drive continuously variable transmission.

Referring now to the drawings, particularly to FIG. 1, there is shown part of a power train of an automotive vehicle with a belt-drive continuously variable transmission (belt-drive CVT) 300, and a detailed structure of a speed-change hydraulic circuit. Power output produced by an engine 10 is transmitted through a torque converter 20 and a forward-and-reverse switching mechanism or a forward-and-reverse clutch (simply, F/R clutch) 30 to belt-drive CVT 300. As seen from the system diagram of FIG. 1, belt-drive CVT 300 uses an endless drive belt 330, such as an endless segmented steel belt, running in a pair of variable-width pulleys 310 and 320, namely primary and secondary-driving and driven-pulleys whose effective diameters are continuously variable to provide varying pulley ratios or transmission ratios. As shown in FIG. 1, V grooves of primary and secondary pulleys 310 and 320 are aligned with each other, and drive belt 330 is wound on the V grooves of primary and secondary pulleys 310 and 320. The drive belt, the V groove of primary variable-width input pulley 310, and the V groove of secondary variable-width output pulley 320 construct a so-called wrapping connector. An engine crankshaft of engine 10 is coaxially aligned with the axis of primary pulley 310. F/R clutch 30 is mainly constructed by a double-pinion planetary gearset. A sun gear of the planetary gearset is connected through torque converter 20 to engine 10, whereas a planet-pinion carrier of the planetary gearset is connected to primary pulley 310. F/R clutch 30 is also comprised of a forward clutch through which the sun gear and the carrier of the planetary gearset are directly coupled with each other or uncoupled from each other, and a reverse brake serving to stop or permit rotation of the ring gear of the planetary gearset. With the forward clutch engaged, torque is transmitted from engine 10 via torque converter 20 and F/R clutch 30 to primary pulley 310 without changing the rotation direction. On the contrary, with the reverse brake applied, torque, transmitted from engine 10 into torque converter 20, is further transmitted to primary pulley 310, with the reduced rotational speed and different rotation direction. Thereafter, torque, transmitted through primary pulley 310 and drive belt 330 to secondary pulley 320, is transmitted via a CVT output shaft and a gear set to a differential gear, and then transmitted via axle driveshafts to drive wheels (not shown). In order to change a ratio of the rotational speed of primary pulley 310 to the rotational speed of secondary pulley 320, that is, a transmission ratio or a pulley ratio of belt-drive CVT 300 during power transmission, the V grooves of primary and secondary pulleys 310 and 320 are constructed as follows.

The V groove of primary variable-width input pulley 310 is constructed by a stationary flange (or a stationary sheave) and an adjustable flange (or a movable sheave) 311 axially slidable on linear ball bearing splines (not shown) for varying the width of the V groove of primary pulley 310 by way of spring bias (a preload of a preloading spring) plus hydraulic pressure, often called a "primary pulley pressure". In a similar manner, the V groove of secondary pulley 320 is constructed by a stationary flange and an adjustable flange 321 axially slidable on linear ball splines (not shown) for varying the width of the V groove of secondary pulley 320 by way of spring bias (a preload of a preloading spring) plus hydraulic pressure, often called a "secondary pulley pressure". In order to steplessly vary the pulley ratio of belt-drive CVT 300, the adjustable flanges of primary and secondary pulleys 310 and 320 are designed to slide axially on the linear ball bearing splines, relative to the fixed flanges and to prevent relative rotation of the adjustable flanges to the respective fixed flanges. Actually, the radius of rotation of drive belt 330 of the primary pulley side, in other words, the radius of the contact circle of drive belt 330 wound on the V groove of primary pulley 310, that is, half of the effective pitch diameter of primary input pulley 310 and the radius of rotation of drive belt 330 of the secondary pulley side, in other words, the radius of the contact circle of drive belt 330 wound on the V groove of secondary pulley 320, that is, half of the effective pitch diameter of secondary output pulley 320 can be independently varied by controlling the primary pulley pressure and the secondary pulley pressure independently of each other.

As can be seen from the hydraulic circuit shown in FIG. 1, an oil pump 40, serving as a hydraulic pressure source, is provided. Hydraulic pressure produced by oil pump 40 is adjusted or regulated to a line pressure by means of a first pressure regulator 51. The line pressure is supplied from first pressure regulator 51 to primary and secondary pressure regulating valves 71 and 72. Hydraulic pressure produced by oil pump 40 is also adjusted or regulated to a pilot pressure by means of second pressure regulator 52. The pilot pressure is supplied from second pressure regulator 52 to primary and secondary solenoid valves 61 and 62. A CVT control unit 100 controls primary and secondary solenoid valves 61 and 62, such that the pilot pressure, supplied to each of solenoid valves 61 and 62, is adjusted or regulated to desired signal pressures via the respective solenoid valves, and then the regulated signal pressures are supplied from solenoid valves 61 and 62 to the respective pressure regulating valves 71 and 72. Primary pressure regulating valve 71 regulates the line pressure to a primary pulley pressure in response to the signal pressure applied from primary solenoid valve 61, while secondary pressure regulating valve 72 regulates the line pressure to a secondary pulley pressure in response to the signal pressure applied from secondary solenoid valve 62. The primary pulley pressure, obtained by regulating the line pressure by primary pressure regulating valve 71, is supplied to a primary pulley actuation cylinder or a primary pulley actuation chamber associated with the primary-pulley adjustable flange 311, while the secondary pulley pressure, obtained by regulating the line pressure by secondary pressure regulating valve 72, is supplied to a secondary pulley actuation cylinder or a secondary pulley actuation chamber associated with the secondary-pulley adjustable flange 321. That is, the level of the primary pulley pressure fed to the primary pulley actuation chamber associated with primary pulley 310 and the level of the secondary pulley pressure fed to the secondary pulley actuation chamber associated with secondary pulley 320 can be independently controlled responsively to command signals from CVT control unit 100 to primary and secondary solenoid valves 61 and 62. In more detail, the primary-pulley adjustable flange 311 is forced toward the associated stationary flange by supplying the primary pulley pressure to the primary pulley actuation chamber and simultaneously the secondary-pulley adjustable flange 321 is forced toward the associated stationary flange by supplying the secondary pulley pressure to the secondary pulley actuation chamber, to enable power transmission between primary and secondary pulleys 310 and 320 via drive belt 330, while keeping the drive belt in friction-contact with the V grooves of input and output pulleys 310 and 320. With the previously-described CVT control hydraulic circuit, during ratio changing operation, it is possible to achieve a desired pulley ratio of belt-drive CVT 300 by varying the widths of V grooves of primary and secondary pulleys 310 and 320 by way of the primary and secondary pulley pressures controlled independently of each other by the CVT control unit 100, abbreviated to "CVT CU".

Figure 2:
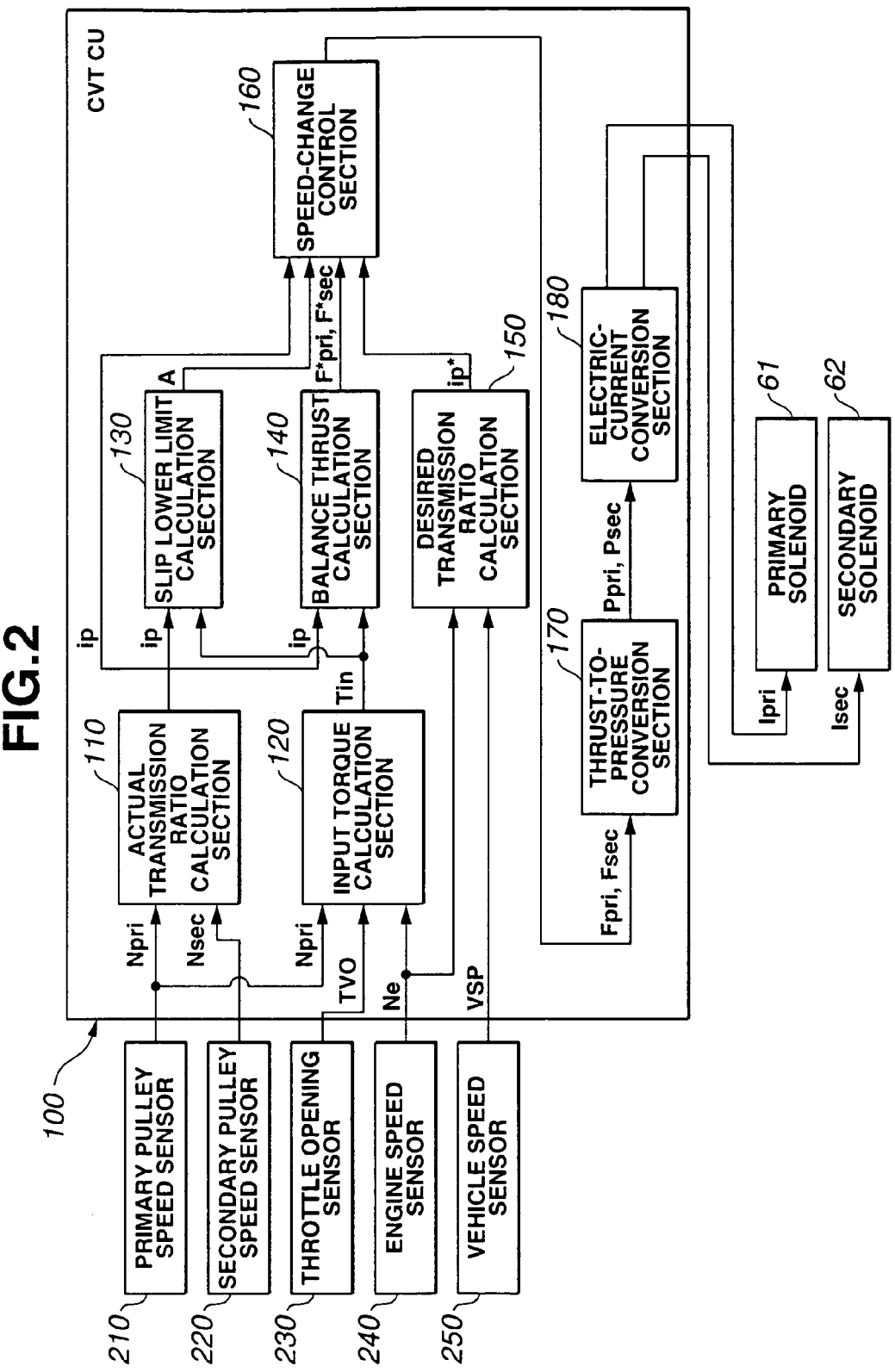
FIG. 2 is a block diagram of a CVT control unit incorporated in the hydraulic pressure control apparatus of the embodiment.

Referring now to FIG. 2, there is shown the control block diagram of CVT CU 100. As clearly shown in the block diagram of FIG. 2, CVT CU 100 is comprised of an actual transmission ratio calculation section 110, an input torque calculation section 120, a drive-belt slip lower limit calculation section (simply, a slip lower limit calculation section) 130, a balance thrust calculation section 140, a desired transmission ratio calculation section 150, a speed-change control section 160, a thrust-to-pressure conversion section 170, and an electric-current conversion section 180. CVT CU 100 generally comprises a microcomputer. CVT CU 100 includes an input/output interface (I/O), memories (RAM, ROM), and a microprocessor or a central processing unit (CPU). The input/output interface (I/O) of CVT CU 100 receives input information from various engine/vehicle sensors (a vehicular information detector), namely a primary pulley speed sensor 210, a secondary pulley speed sensor 220, a throttle opening sensor 230, an engine speed sensor 240, and a vehicle speed sensor 250. Primary pulley speed sensor 210 is provided to detect a primary pulley speed Npri, while secondary pulley speed sensor 220 is provided to detect a secondary pulley speed Nsec. Throttle opening sensor 230 is provided to detect a throttle opening TVO. Engine speed sensor 240 is provided to detect an engine speed Ne, whereas vehicle speed sensor 250 is provided to detect a vehicle speed VSP. Within CVT CU 100, the central processing unit (CPU) allows the access by the I/O interface of input information data signals from the engine/vehicle sensors. The CPU of CVT CU 100 is responsible for carrying the CVT control program stored in memories and is capable of performing necessary arithmetic and logic operations containing the pulley thrust control (described later in reference to the flow chart of FIG. 3) and thrust-to-pressure conversion (described later in reference to the flow chart of FIG. 4). Computational results (arithmetic calculation results), that is, calculated output signals are relayed through the output interface circuitry of CVT CU 100 to output stages, namely, an electronically-controlled ratio-change control actuator or an electronically-controlled hydraulic actuator including an electromagnetic solenoid of primary solenoid valve 61 and an electromagnetic solenoid of secondary solenoid valve 62.

Actual transmission ratio calculation section 110 of the CPU of CVT CU 100 calculates an actual transmission ratio (or an actual pulley ratio) ip, based on primary pulley speed Npri and secondary pulley speed Nsec, that is, ip=(Npri/Nsec). Information about the calculated actual transmission ratio ip is output from actual transmission ratio calculation section 110 to each of slip lower limit calculation section 130, balance thrust calculation section 140, and speed-change control section 160.

Input torque calculation section 120 of the CPU of CVT CU 100 calculates a speed ratio VS based on primary pulley speed Npri and engine speed Ne, and also calculates an engine torque Te based on throttle opening TVO and engine speed Ne. Additionally, input torque calculation section 120 calculates an input torque Tin to be input into primary pulley 310, based on the calculated speed ratio VS and engine torque Te. Information about the calculated input torque Tin is output from input torque calculation section 120 to each of slip lower limit calculation section 130 and balance thrust calculation section 140.

Slip lower limit calculation section 130 calculates a slip-limit pulley thrust (or a slip lower limit pulley thrust) A for each of primary and secondary pulleys 310 and 320, based on actual transmission ratio ip and input torque Tin. Slip-limit pulley thrust A correlates with a drive-belt contact pressure, which should be proportional to a transmitted torque. The calculated slip-limit pulley thrust Apri for primary pulley 310 and the calculated slip-limit pulley thrust Asec for secondary pulley 320 are output from slip lower limit calculation section 130 to speed-change control section 160. Slip-limit pulley thrust A for each of primary and secondary pulleys 310 and 320 is defined as a lower limit (or a lower limit guard) of the pulley thrust that enables torque transmission between primary and secondary pulleys 310 and 320 without slippage of drive belt 330. More concretely, on the assumption that a transmitted torque of primary pulley 310 is denoted by Tpri, a radius of the contact circle of drive belt 330 wound on primary pulley 310 is denoted by Rpri, a V-groove angle between the V-grooved faces of the fixed flange and the adjustable flange 311 of primary pulley 310 is denoted by θ, a dynamic friction coefficient of the point of contact between the variable-width pulley (primary pulley 310 or secondary pulley 320) and drive belt 330 is denoted by μ, and a pulley thrust of primary pulley 310 is denoted by Fpri, the transmitted torque Tpri of primary pulley 310 is represented by the following expression.

$$Tpri = Rpri \times 2\mu \times Fpri / \cos\theta$$

That is, the primary pulley thrust Fpri is represented by the following expression.

$$Fpri = Tpri \times \cos\theta / (2\mu \times Rpri)$$

The necessary condition where no slippage of drive belt 330 occurs at the contact surface between the variable-width pulley (primary pulley 310) and the drive belt is that the frictional force between the variable-width pulley (primary pulley 310) and drive belt 330 is greater than or equal to the transmitted torque of the variable-width pulley. Assuming that a safety factor is denoted by εpri, the slip-limit pulley thrust Apri for primary pulley 310 is obtained by the following expression (1).

$$Apri = \epsilon pri \times Fpri = \epsilon pri \times Tpri \times \cos\theta / (2\mu \times Rpri) \quad (1)$$

In a similar manner, the slip-limit pulley thrust Asec for secondary pulley 320 is obtained by the following expression (2).

$$Asec = \epsilon sec \times Fsec = \epsilon sec \times Tsec \times \cos\theta / (2\mu \times Rsec) \quad (2)$$

where εsec denotes a safety factor for slip-limit pulley thrust Asec of the secondary pulley side, Fsec denotes a pulley thrust of secondary pulley 320, Tsec denotes a transmitted torque of secondary pulley 320, Rsec denotes a radius of the contact circle of drive belt 330 wound on secondary pulley 320, θ denotes the V-groove angle between the V-grooved faces of the fixed flange and the adjustable flange 321 of secondary pulley 320, and μ denotes the dynamic friction coefficient of the point of contact between the variable-width pulley and drive belt 330. Assuming that a tensile force of drive belt 330 running in the pulley pair 310 and 320 is constant and denoted by "T", the following equation is satisfied.

$$T = Tpri/Rpri = Tsec/Rsec$$

Then, $Tsec = Tpri \times Rsec/Rpri$ \quad (3)

From the previously-noted expressions (2) and (3), the following expression (4) is obtained.

$$\begin{aligned}Asec &= \epsilon sec \times (Tpri \times Rsec / Rpri) \times \cos\theta / (2\mu \times Rsec) \\ &= \epsilon sec \times Tpri \times \cos\theta / (2\mu \times Rpri)\end{aligned} \quad (4)$$

From the previously-noted expressions (1) and (4), the following expression (5) is obtained.

$$Asec = (\epsilon sec/\epsilon pri) \times Apri \quad (5)$$

On the assumption that the safety factor εpri for slip-limit pulley thrust Apri of the primary pulley side and the safety factor εsec for slip-limit pulley thrust Asec of the secondary pulley side are equal to each other, the following equation is obtained.

$$Asec = (\epsilon sec/\epsilon pri) \times Apri = Apri = A$$

That is to say, under the condition of εpri=εsec, slip-limit pulley thrust Apri of the primary pulley side and slip-limit pulley thrust Asec of the secondary pulley side are also equal to each other.

Balance thrust calculation section 140 calculates a primary-pulley balance thrust F*pri and a secondary-pulley balance thrust F*sec, based on actual transmission ratio ip and input torque Tin. Information about the calculated primary-pulley balance thrust F*pri and secondary-pulley balance thrust F*sec, which are collectively referred to as "F*", is output from balance thrust calculation section 140 to speed-change control section 160. Balance thrust F* (F*pri, F*sec) is defined as a pulley thrust suited to both of actual transmission ratio ip and input torque Tin.

Desired transmission ratio calculation section 150 calculates desired transmission ratio ip* based on engine speed Ne and vehicle speed VSP. Information about the calculated desired transmission ratio ip* is output from desired transmission ratio calculation section 150 to speed-change control section 160.

Speed-change control section 160 calculates a primary-pulley-thrust command value Fpri for primary-pulley adjustable flange 311 and a secondary-pulley-thrust command value Fsec for secondary-pulley adjustable flange 321, on the basis of actual transmission ratio ip, slip-limit pulley thrust A (=Apri=Asec) of each of primary and secondary pulleys 310 and 320, primary-pulley balance thrust F*pri and secondary-pulley balance thrust F*sec, and desired transmission ratio ip*, in such a manner as to ensure or achieve a differential thrust between the primary and secondary pulley thrusts, corresponding to desired transmission ratio ip*. Information about the calculated primary-pulley-thrust command value Fpri and secondary-pulley-thrust command value Fsec is output from speed-change control section 160 to thrust-to-pressure conversion section 170.

Thrust-to-pressure conversion section 170 converts primary-pulley-thrust command value Fpri into a primary-pulley-pressure command value Ppri, and also converts secondary-pulley-thrust command value Fsec into a secondary-pulley-pressure command value Psec. The thrust-to-pressure conversion action includes compensation for a change in the primary pulley pressure in the primary pulley actuation chamber associated with primary pulley 310, arising from working fluid centrifugal effects (centrifugal force), a change in the secondary pulley pressure in the secondary pulley actuation chamber associated with secondary pulley 320, arising from working fluid centrifugal effects, a preload of the preloading spring for primary-pulley adjustable flange 311, a preload of the preloading spring for secondary-pulley adjustable flange 321, a difference between the pressure receiving area of the primary pulley actuation chamber and the pressure receiving area of the secondary pulley actuation chamber. Information about the primary-pulley-pressure command value Ppri determined based on primary-pulley-thrust command value Fpri and secondary-pulley-pressure command value Psec determined based on secondary-pulley-thrust command value Fsec is output from thrust-to-pressure conversion section 170 to electric-current conversion section 180.

Electric-current conversion section 180 converts primary-pulley-pressure command value Ppri into a primary solenoid control current Ipri of primary solenoid valve 61, and also converts secondary-pulley-pressure command value Psec into a secondary solenoid control current Isec of secondary solenoid valve 62. Then, electric-current conversion section 180 outputs primary and secondary solenoid control currents Ipri and Isec to respective electromagnetic solenoids of primary and secondary solenoid valves 61 and 62.

Figure 3:
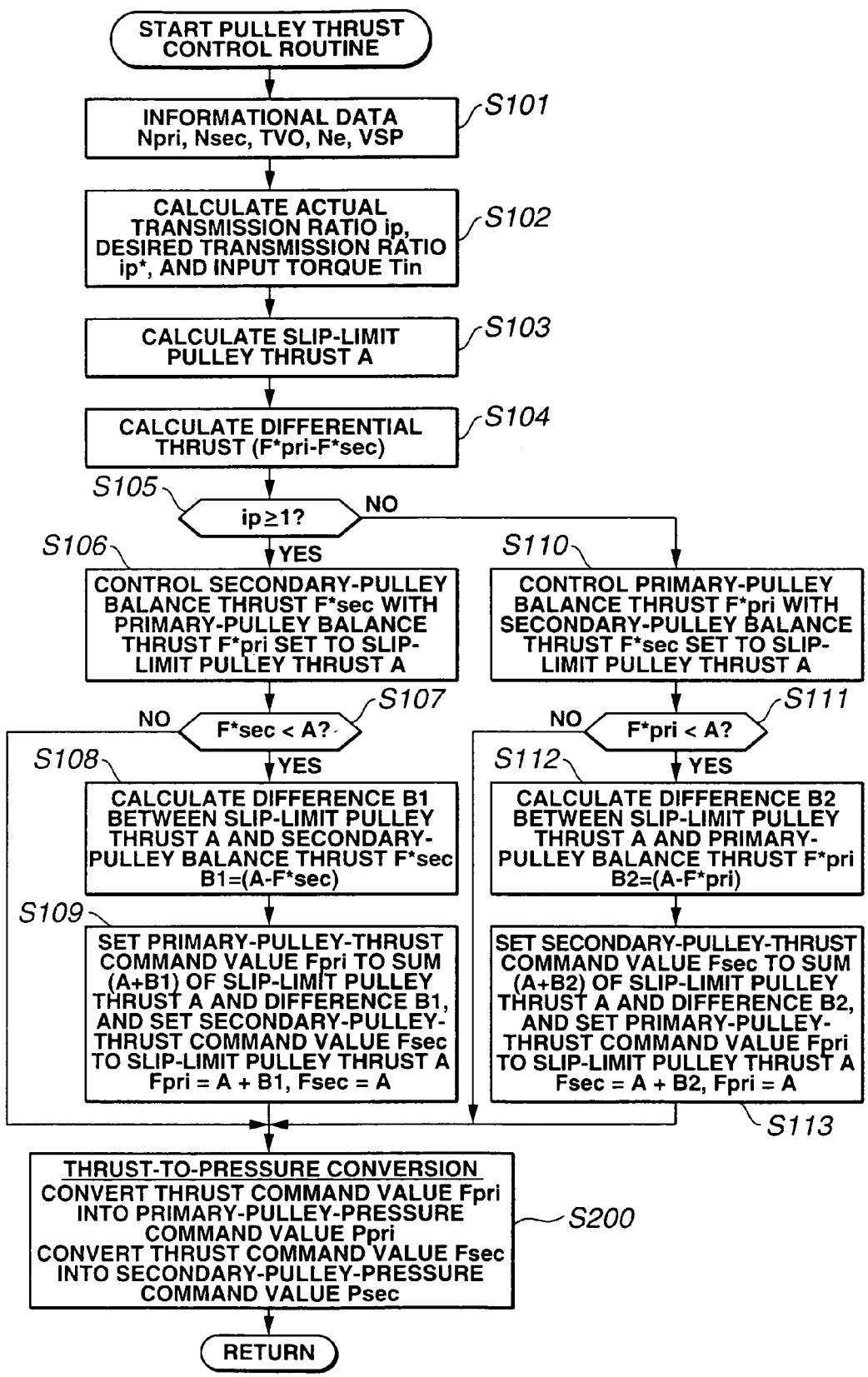
FIG. 3 is a flow chart showing a pulley-thrust calculation plus pulley-thrust control routine executed within the CVT control unit.

Referring now to FIG. 3, there is shown the pulley-thrust calculation plus pulley-thrust control routine (simply, the pulley-thrust control routine) executed within the processor of CVT CU 100. The pulley-thrust control routine shown in FIG. 3 is executed as time-triggered interrupt routines to be triggered every predetermined time intervals such as 10 milliseconds.

At step S101, input informational data signals Npri, Nsec, TVO, Ne, and VSP from primary pulley speed sensor 210, secondary pulley speed sensor 220, throttle opening sensor 230, engine speed sensor 240, and vehicle speed sensor 250 are read. After step S101, step S102 occurs.

At step S102, actual transmission ratio ip, desired transmission ratio ip*, and input torque Tin are calculated. After step S102, step S103 occurs.

At step S103, slip-limit pulley thrust A for each of primary and secondary pulleys 310 and 320 is calculated based on actual transmission ratio ip and input torque Tin. After step S103, step S104 occurs.

At step S104, first, primary-pulley balance thrust F*pri and secondary-pulley balance thrust F*sec are calculated based on actual transmission ratio ip and input torque Tin. Next, a differential thrust (F*pri−F*sec) between primary-pulley balance thrust F*pri and secondary-pulley balance thrust F*sec is calculated. Described hereunder, in accordance with steps S105-S113 executed subsequently to step S104, primary-pulley-thrust command value Fpri for primary-pulley adjustable flange 311 and secondary-pulley-thrust command value Fsec for secondary-pulley adjustable flange 321 are calculated to ensure the differential thrust (F*pri−F*sec), taking into account desired transmission ratio ip*. Differential thrust (F*pri−F*sec), calculated through step S104, is used at each of the following steps S106 and S110.

At step S105 executed subsequently to step S104, a check is made to determine whether actual transmission ratio ip, calculated through step S102, is greater than or equal to "1". When the answer to step S105 is in the affirmative (YES), that is, in case of ip≧1, the routine proceeds from step S105 to step S106. Conversely when the answer to step S105 is in the negative (NO), that is, in case of ip<1, the routine proceeds from step S105 to step S110.

At step S106, in order to ensure differential thrust (F*pri−F*sec), calculated through step S104, while preventing slippage of drive belt 330, secondary-pulley balance thrust F*sec is controlled or changed with primary-pulley balance thrust F*pri set to slip-limit pulley thrust A. Thereafter, the routine proceeds from step S106 to step S107.

At step S107, a check is made to determine whether secondary-pulley balance thrust F*sec is less than slip-limit pulley thrust A. When the answer to step S107 is affirmative (i.e., F*sec<A), the routine proceeds from step S107 to step S108. Conversely when the answer to step S107 is negative (i.e., F*sec≧A), the routine proceeds from step S107 to step S200.

At step S108, a difference B1 between slip-limit pulley thrust A and secondary-pulley balance thrust F*sec is calculated, that is, B1=|Asec−F*sec|=|A−F*sec|. After step S108, step S109 occurs.

At step S109, primary-pulley-thrust command value Fpri is set to the sum (A+B1=Apri+B1) of slip-limit pulley thrust A and the difference B1, while secondary-pulley-thrust command value Fsec is set to slip-limit pulley thrust A (=Asec). After step S109, step S200 occurs.

At step S110, in order to ensure differential thrust (F*pri−F*sec), calculated through step S104, while preventing slippage of drive belt 330, primary-pulley balance thrust F*pri is controlled or changed with secondary-pulley balance thrust F*sec set to slip-limit pulley thrust A. Thereafter, the routine proceeds from step S110 to step S111.

At step S111, a check is made to determine whether primary-pulley balance thrust F*pri is less than slip-limit pulley thrust A. When the answer to step S111 is affirmative (i.e., F*pri<A), the routine proceeds from step S111 to step S112. Conversely when the answer to step S111 is negative (i.e., F*pri≧A), the routine proceeds from step S111 to step S200.

At step S112, a difference B2 between slip-limit pulley thrust A and primary-pulley balance thrust F*pri is calculated, that is, B2=|Apri−F*pri|=|A−F*pri|. After step S112, step S113 occurs.

At step S113, secondary-pulley-thrust command value Fsec is set to the sum (A+B2=Asec+B2) of slip-limit pulley thrust A and the difference B2, while primary-pulley-thrust command value Fpri is set to slip-limit pulley thrust A (=Apri). After step S113, step S200 occurs.

At step S200, within thrust-to-pressure conversion section 170, primary-pulley-thrust command value Fpri is converted into primary-pulley-pressure command value Ppri, while secondary-pulley-thrust command value Fsec is converted into secondary-pulley-pressure command value Psec.

Figure 4:
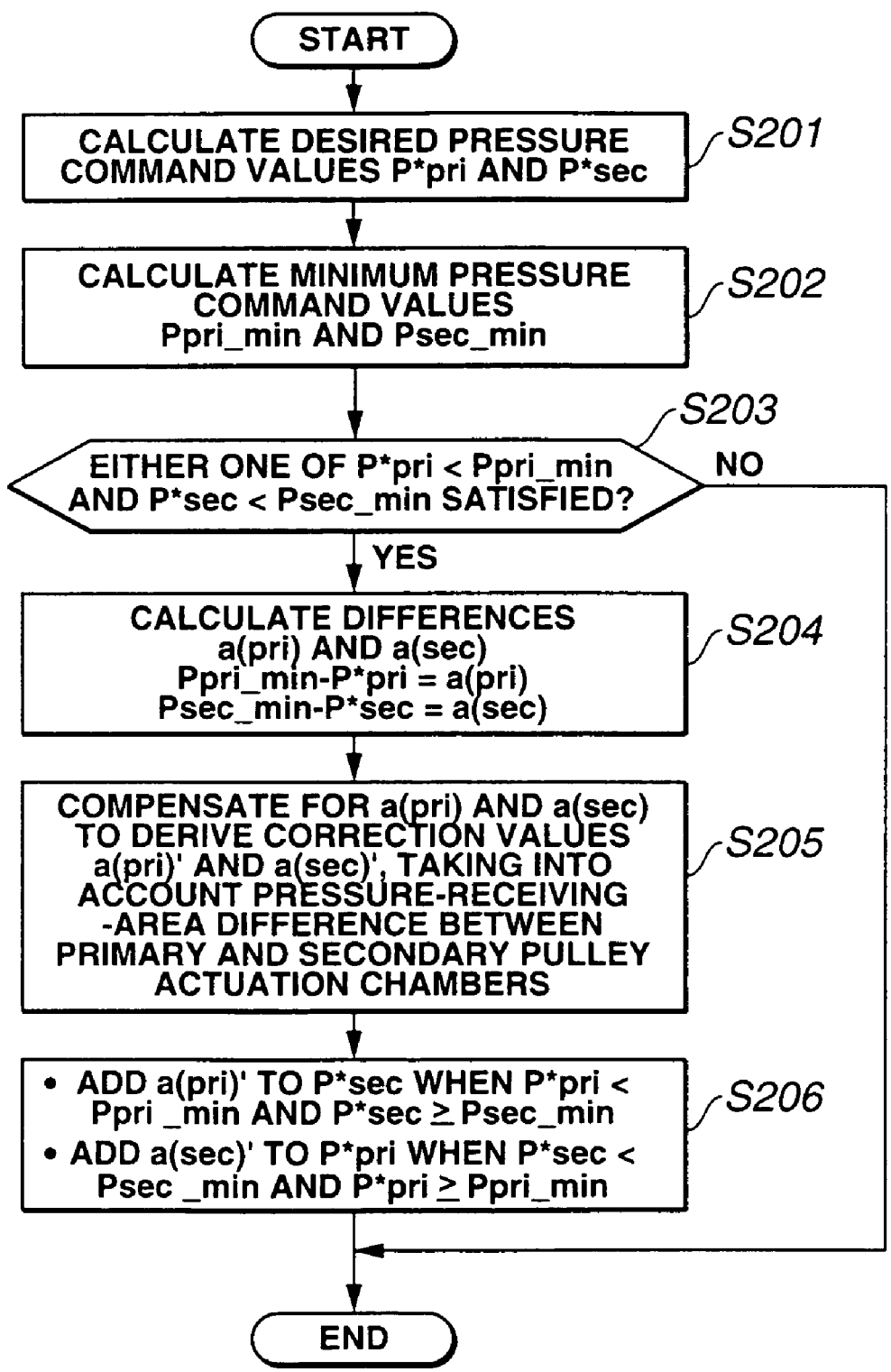
FIG. 4 is a flow chart showing a thrust-to-pressure conversion plus pulley-pressure control routine executed within the CVT control unit.

Referring now to FIG. 4, there is shown the thrust-to-pressure conversion plus pulley-pressure control routine (simply, the thrust-to-pressure conversion routine) executed within thrust-to-pressure conversion section 170 of CVT CU 100. Thrust-to-pressure conversion section 170 of CVT CU 100 includes a detector that detects or estimates or computes at least three factors or at least three conditions, namely (i) a change in hydraulic pressure in the primary pulley actuation chamber associated with primary pulley 310, arising from working fluid centrifugal effects (centrifugal force created by rotation of primary pulley 310) and a change in hydraulic pressure in the secondary pulley actuation chamber associated with secondary pulley 320, arising from working fluid centrifugal effects (centrifugal force created by rotation of secondary pulley 320), (ii) a preload of the preloading spring for primary-pulley adjustable flange 311 and a preload of the preloading spring for secondary-pulley adjustable flange 321, and (iii) a difference between the pressure receiving area of the primary pulley actuation chamber and the pressure receiving area of the secondary pulley actuation chamber. The thrust-to-pressure conversion routine shown in FIG. 4 is also executed as time-triggered interrupt routines to be triggered every predetermined time intervals.

At step S201, a desired primary-pulley-pressure command value P*pri and a desired secondary-pulley-pressure command value P*sec are calculated based on the previously-noted primary-pulley-thrust command value Fpri and secondary-pulley-thrust command value Fsec, taking into account at least three factors, namely (i) a first factor including a change in hydraulic pressure in the primary pulley actuation chamber associated with primary pulley 310, arising from working fluid centrifugal effects (centrifugal force created by rotation of primary pulley 310) and a change in hydraulic pressure in the secondary pulley actuation chamber associated with secondary pulley 320, arising from working fluid centrifugal effects (centrifugal force created by rotation of secondary pulley 320), (ii) a second factor including a preload of the preloading spring for primary-pulley adjustable flange 311 and a preload of the preloading spring for secondary-pulley adjustable flange 321, and (iii) a third factor including a difference between the pressure receiving area of the primary pulley actuation chamber and the pressure receiving area of the secondary pulley actuation chamber. After step S201, step S202 occurs.

At step S202, a minimum primary-pulley-pressure command value Ppri_min and a minimum secondary-pulley-pressure command value Psec_min are calculated or derived from the previously-noted primary-pulley-thrust command value Fpri and secondary-pulley-thrust command value Fsec, taking into account the above three factors, in particular, the first and second factors. After step S202, step S203 occurs.

At step S203, a check is made to determine whether either one of a first condition (P*pri<Ppri_min) where desired primary-pulley-pressure command value P*pri, calculated through step S201, is less than minimum primary-pulley-pressure command value Ppri_min and a second condition (P*sec<Psec_min) where desired secondary-pulley-pressure command value P*sec, calculated through step S201, is less than minimum secondary-pulley-pressure command value Psec_min, is satisfied. When the answer to step S203 is affirmative (P*pri<Ppri_min or P*sec<Psec_min), the routine proceeds from step S203 to step S204. Conversely when the answer to step S203 is negative (NO), one execution cycle of the control routine of FIG. 4 terminates.

At step S204, a primary-pulley-side difference a(pri) between minimum primary-pulley-pressure command value Ppri_min and desired primary-pulley-pressure command value P*pri is calculated, that is, Ppri_min−P*pri=a(pri), and at the same time a secondary-pulley-side difference a(sec) between minimum secondary-pulley-pressure command value Psec_min and desired secondary-pulley-pressure command value P*sec is calculated, that is, Psec_min−P*sec=a(sec). After step S204, step S205 occurs.

At step S205, fully taking into account the third factor, that is, the pressure-receiving-area difference between the primary and secondary pulley actuation chambers, the calculated primary-pulley-side difference a(pri)=Ppri_min−P*pri between minimum primary-pulley-pressure command value Ppri_min and desired primary-pulley-pressure command value P*pri is compensated for as a correction value a(pri)′, and also the calculated secondary-pulley-side difference a(sec)=Psec_min−P*sec between minimum secondary-pulley-pressure command value Psec_min and desired secondary-pulley-pressure command value P*sec is compensated for as a correction value a(sec)′. After step S205, step S206 occurs.

At step S206, when the first condition (P*pri<Ppri_min) is satisfied and the second condition (P*sec<Psec_min) is unsatisfied, that is, in case that the desired pressure command value is less than the minimum pressure command value only at the primary pulley side (i.e., P*pri<Ppri_min and P*sec≧Psec_min), a final pressure command value Psec={P*sec+a(pri)′} of the secondary pulley side is calculated by adding the correction value a(pri)′, which substantially corresponds to the deviation of desired primary-pulley-pressure command value P*pri (<Ppri_min) from minimum primary-pulley-pressure command value Ppri_min, to desired secondary-pulley-pressure command value P*sec of the secondary pulley side that the desired pressure command value is greater than or equal to the minimum pressure command value and thus the condition of P*sec≧Psec_min is satisfied. On the contrary, when the second condition (P*sec<Psec_min) is satisfied and the first condition (P*pri<Ppri_min) is unsatisfied, that is, in case that the desired pressure command value is less than the minimum pressure command value only at the secondary pulley side (i.e., P*sec<Psec_min and P*pri≧Ppri_min), a final pressure command value Ppri={P*pri+a(sec)′} of the primary pulley side is calculated by adding the correction value a(sec)′, which substantially corresponds to the deviation of desired secondary-pulley-pressure command value P*sec (<Psec_min) from minimum secondary-pulley-pressure command value Psec_min, to desired primary-pulley-pressure command value P*pri of the primary pulley side that the desired pressure command value is greater than or equal to the minimum pressure command value and thus the condition of P*pri≧Ppri_min is satisfied. In this manner, one execution cycle of the thrust-to-pressure conversion routine of FIG. 4 terminates.

[Comparison Between Earlier Pulley Thrust Control and Improved Pulley Thrust Control of the Embodiment]

[1-1: Comparison Between Transmission-Ratio Versus Thrust Correlation Diagrams of Earlier Pulley Thrust Control and Improved Pulley Thrust Control Within Transmission Ratio Range of ip≧1]

Figure 5A:
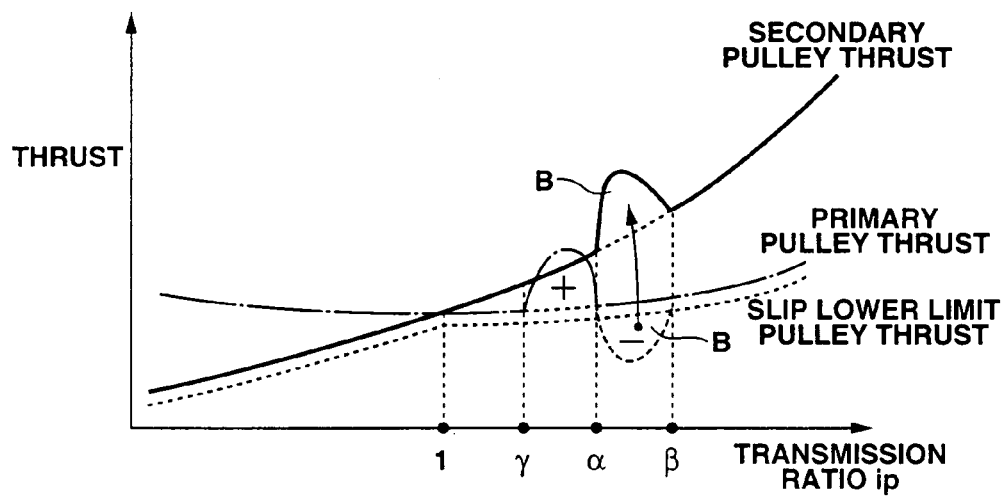
FIG. 5A is the characteristic diagram explaining the pulley thrust control executed by the earlier CVT hydraulic pressure control apparatus during a shift within a pulley-ratio range higher than or equal to "1".
Figure 5B:
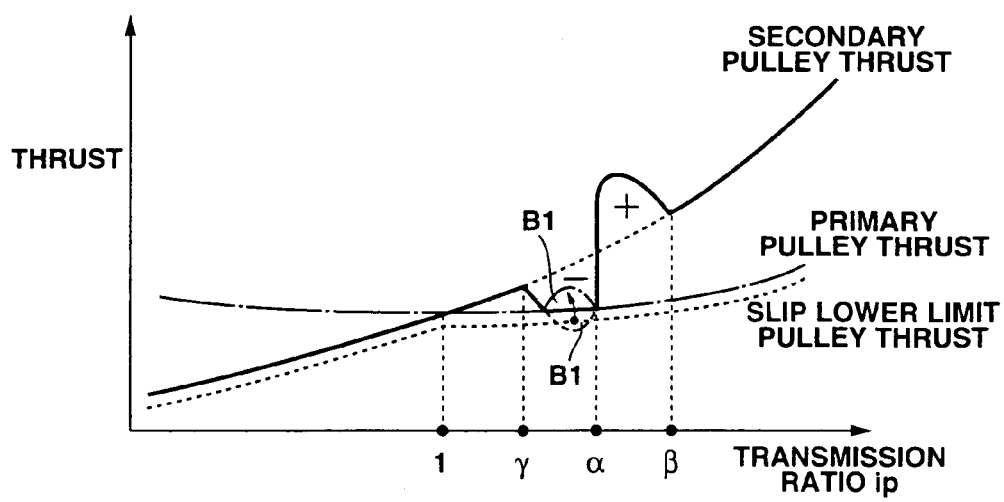
FIG. 5B is the characteristic diagram explaining the pulley thrust control executed by the CVT hydraulic pressure control apparatus of the embodiment during a shift within a pulley-ratio range higher than or equal to "1".

FIGS. 5A-5B show the comparison result between the earlier pulley thrust control (see FIG. 5A) and the improved pulley thrust control (see FIG. 5B) performed by the pressure control apparatus of the embodiment, during a shift within a transmission-ratio range higher than or equal to "1".

In the earlier pulley thrust control, a lower limit guard (corresponding to slip-limit pulley thrust A) for each of pulley thrusts of primary and secondary pulleys is set for belt slippage avoidance. Pulley thrust control is performed in a manner so as to ensure a differential thrust corresponding to a desired transmission ratio by building up or reducing a pulley thrust of the lower-thrust pulley during a shift. However, when a pulley-thrust command value of the lower-thrust pulley (the primary pulley in FIG. 5A) becomes less than the slip lower limit pulley thrust (the lower limit guard), on the one hand, the lower-thrust-pulley thrust command value is held at the lower limit guard. On the other hand, in order to avoid a transient shifting responsiveness from deteriorating owing to a decrease in the time rate of change in the radius of the contact circle of the drive belt of the lower-thrust pulley, arising from holding the calculated pulley thrust at the lower limit guard and thus to ensure the shifting responsiveness, a difference (see the area B indicated by the minus (−) sign in FIG. 5A) between the lower-thrust-pulley thrust command value and the lower limit guard is calculated and thereafter the calculated difference is added (see the arrow of FIG. 5A) to the higher-thrust-pulley thrust command value.

In contrast, in the improved pulley thrust control of the pressure control apparatus of the embodiment, during a shift within a transmission-ratio range higher than or equal to "1" a lower-thrust-pulley thrust command value is basically held at slip-limit pulley thrust A (corresponding to the lower limit guard). Pulley thrust control is performed in a manner so as to ensure a differential thrust corresponding to a desired transmission ratio by building up or reducing a pulley thrust of the higher-thrust pulley and thus to bring the transmission ratio closer to the desired transmission ratio during a shift within a transmission-ratio range higher than or equal to "1". However, when a thrust command value of the higher-thrust pulley (the secondary pulley in FIG. 5B) becomes less than slip-limit pulley thrust A, on the one hand, the higher-thrust-pulley thrust command value is held at slip-limit pulley thrust A (or the lower limit guard). On the other hand, in order to ensure the shifting responsiveness, a difference (see the area B1 indicated by the minus (−) sign in FIG. 5B) between the higher-thrust-pulley thrust command value and slip-limit pulley thrust A is calculated and thereafter the calculated difference is added (see the arrow of FIG. 5B) to the lower-thrust-pulley thrust command value.

[During Downshift Within Transmission Ratio Range of ip≧1]

When a downshift is made by increasing from a pulley ratio α to a pulley ratio β, the radius of the contact circle of the drive belt of the primary pulley has to be contracted or decreased, while the radius of the contact circle of the drive belt of the secondary pulley has to be expanded or increased.

In the earlier pulley thrust control shown in FIG. 5A, in order to decrease the radius of the contact circle of the drive belt of the lower-thrust pulley side (that is, the primary pulley) and thus to achieve the α→β downshift, the primary pulley thrust is reduced. During the β→β downshift, the primary pulley thrust corresponding to the desired transmission ratio β tends to become less than slip-limit pulley thrust A (see the area B indicated by the minus (−) sign in FIG. 5A). As clearly seen from setting of primary and secondary pulley thrusts during the α→β downshift in FIG. 5A, the difference B between the desired primary pulley thrust (i.e., the lower-thrust-pulley thrust command value) and the lower limit guard (i.e., slip-limit pulley thrust A) is calculated and thereafter the calculated difference B is added (see the arrow of FIG. 5A) to the secondary pulley thrust of the higher-thrust pulley side.

In contrast, in the improved pulley thrust control shown in FIG. 5B, the primary pulley thrust of the lower-thrust pulley side is held at slip-limit pulley thrust A, and thus the secondary pulley thrust (exactly, secondary-pulley balance thrust F*sec) is increased (see the area indicated by the plus (+) sign in FIG. 5B) in such a manner as to expand or increase the radius of the contact circle of the drive belt of secondary pulley 320.

As discussed above, resultingly, during the downshift within the transmission ratio range of ip≧1, in both of the earlier pulley thrust control (see the α→β downshift in FIG. 5A) and the improved pulley thrust control (see the α→β downshift in FIG. 5B), the primary pulley thrust is held at slip-limit pulley thrust A (the lower limit guard), while the secondary pulley thrust is increased to ensure the differential thrust of primary and secondary pulley thrusts, corresponding to desired transmission ratio ip* (=β) and thus to achieve the desired downshift. Therefore, during the downshift within the transmission ratio range of ip≧1, in the improved pulley thrust control (see the α→β downshift in FIG. 5B) as well as the earlier pulley thrust control (see the α→β downshift in FIG. 5A), the CVT control system requires an increase in hydraulic pressure.

[During Upshift Within Transmission Ratio Range of ip≧1]

When an upshift is made by decreasing from pulley ratio α to a pulley ratio γ, the radius of the contact circle of the drive belt of the primary pulley has to be expanded or increased, while the radius of the contact circle of the drive belt of the secondary pulley has to be contracted or decreased.

In the earlier pulley thrust control shown in FIG. 5A, in order to increase the radius of the contact circle of the drive belt of the lower-thrust pulley side (that is, the primary pulley) and thus to achieve the α→γ upshift, the primary pulley thrust is increased (see the area indicated by the plus (+) sign in FIG. 5A) so that the differential thrust, corresponding to the desired transmission ratio γ, is ensured and the desired α→γ upshift is achieved. During the α→γ upshift, the secondary pulley thrust of the higher-thrust pulley side varies at high thrust levels. As can be seen from setting of primary and secondary pulley thrusts during the α→γ upshift in FIG. 5A, primary and secondary pulley thrusts are both kept at high thrust levels. Therefore, during the upshift within the transmission ratio range of ip≧1, in the earlier pulley thrust control (see the α→γ upshift in FIG. 5A), as a whole, the CVT control system requires high hydraulic pressure, in other words, a high load carried on the engine, thus increasing the fuel consumption.

In contrast, in the improved pulley thrust control of the embodiment shown in FIG. 5B, in order to decrease the radius of the contact circle of the drive belt of the higher-thrust pulley side (that is, the secondary pulley) and thus to achieve the α→γ upshift, the secondary pulley thrust (exactly, secondary-pulley balance thrust F*sec) is decreased so that the differential thrust, corresponding to the desired transmission ratio γ, is ensured. During the α→γ upshift, when the desired secondary pulley thrust, corresponding to secondary-pulley balance thrust F*sec and suited for or calculated based on desired transmission ratio ip*, becomes less than slip-limit pulley thrust A (the lower limit guard), secondary-pulley-thrust command value Fsec is held at slip-limit pulley thrust A, and additionally the difference B1 between slip-limit pulley thrust A and the desired secondary pulley thrust (secondary-pulley balance thrust F*sec) is calculated and then the difference B1 is added to primary-pulley-thrust command value Fpri.

As discussed above, during the upshift within the transmission ratio range of ip≧1, in the earlier pulley thrust control (see the α→γ upshift in FIG. 5A), the primary and secondary pulley thrusts are both held at high thrust levels, and whereby the pressure load (the load carried on the engine to produce high hydraulic pressure) becomes high. In contrast, in the improved pulley thrust control of the embodiment (see the α→γ upshift in FIG. 5B), during the upshift within the transmission ratio range of ip≧1, the pressure load can be reduced by reducing or dropping the secondary-pulley-thrust command value Fsec of the higher-thrust pulley side. When the desired secondary pulley thrust, corresponding to secondary-pulley balance thrust F*sec and suited for and calculated based on desired transmission ratio ip*, becomes less than slip-limit pulley thrust A, secondary-pulley-thrust command value Fsec is held at slip-limit pulley thrust A, and additionally the difference B1 between slip-limit pulley thrust A and the desired secondary pulley thrust (secondary-pulley balance thrust F*sec) is added to primary-pulley-thrust command value Fpri so as to improve and enhance the shifting responsiveness.

[1-2: Comparison of Time Variations of Primary and Secondary Pulley Thrusts Between Earlier Pulley Thrust Control and Improved Pulley Thrust Control Within Transmission Ratio range of ip≧1]

FIG. 6A is the time chart showing time variations in primary and secondary pulley thrusts, obtained by the earlier pulley thrust control shown in FIG. 5A during the upshift within the transmission ratio range higher than or equal to "1", whereas FIG. 6B is the time chart showing time variations in primary and secondary pulley thrusts, obtained by the improved pulley thrust control of the embodiment shown in FIG. 5B during the upshift within the transmission ratio range higher than or equal to "1".

At an upshift starting point t1, an upshift control is initiated. According to the earlier pulley thrust control shown in FIG. 5A, the primary-pulley-thrust command value is controlled in such a manner as to ensure the differential thrust corresponding to the desired transmission ratio by increasing the lower-thrust-pulley thrust command value. Therefore, in order to bring the radius of the contact circle of the drive belt of the lower-thrust pulley and the radius of the contact circle of the drive belt of the higher-thrust pulley closer to their desired radii corresponding to desired transmission ratio ip*, primary-pulley-thrust command value Fpri tends to rapidly rise, while secondary-pulley-thrust command value Fsec tends to gradually fall (see variations in the primary and secondary pulley thrusts just after upshift starting point t1 in FIG. 6A).

In contrast, according to the improved pulley thrust control shown in FIG. 5B, the differential thrust, corresponding to the desired transmission ratio, is ensured by decreasing the higher-thrust-pulley thrust command value. That is, in order to achieve desired transmission ratio ip* by controlling secondary-pulley-thrust command value Fsec of secondary pulley 320 to which a higher pressure is applied during the upshift within the transmission ratio range higher than or equal to "1", the upshift is made by reducing secondary-pulley-thrust command value Fsec, while holding primary-pulley-thrust command value Fpri of primary pulley 310 at slip-limit pulley thrust A. Just after upshift starting point t1 in FIG. 6B, in order to bring the actual transmission ratio closer to desired transmission ratio ip*, secondary-pulley-thrust command value Fsec tends to rapidly fall, and as a result the differential thrust between primary and secondary pulley thrusts rapidly reduces or falls. After this, secondary-pulley-thrust command value Fsec tends to reduce to below slip-limit pulley thrust A, but the lower limit of secondary-pulley-thrust command value Fsec is limited to slip-limit pulley thrust A by means of speed-change control section 160. Therefore, as soon as secondary-pulley-thrust command value Fsec reaches slip-limit pulley thrust A, a fall of secondary-pulley-thrust command value Fsec is stopped or inhibited.

During a time period (t1-t2) between upshift starting point t1 and a point of time t2 in FIG. 6A, according to the earlier pulley thrust control shown in FIG. 5A, the falling state of the secondary pulley thrust (secondary-pulley-thrust command value Fsec) is continued, while the primary pulley thrust tends to slightly moderately decrease with the controlled variable of the primary pulley thrust kept constant.

In contrast, according to the improved pulley thrust control of the embodiment shown in FIG. 5B, during the time period (t1-t2) in FIG. 6B, at the early stage of this time period the falling state of secondary-pulley-thrust command value Fsec is quickly stopped or inhibited immediately when slip-limit pulley thrust A has been reached. As a result of this, the time rate of change in the radius of the contact circle of the drive belt of secondary pulley 320 tends to decrease. At this time, assuming that primary-pulley-thrust command value Fpri remains kept at slip-limit pulley thrust A, the upshift responsiveness is deteriorated. To avoid this, according to the improved pulley thrust control of the embodiment, the difference B1 between slip-limit pulley thrust A and the desired secondary pulley thrust, corresponding to secondary-pulley balance thrust F*sec or secondary-pulley-thrust command value Fsec and suited for and calculated based on desired transmission ratio ip*, is added to primary-pulley-thrust command value Fpri. Owing to such addition of the difference B1 to primary-pulley-thrust command value Fpri, primary-pulley-thrust command value Fpri begins to rise away from slip-limit pulley thrust A and the rising tendency of primary-pulley-thrust command value Fpri continues during the time period (t1-t2). On the other hand, secondary-pulley-thrust command value Fsec is held at slip-limit pulley thrust A during the time period (t1-t2). During the time period (t1-t2), the differential thrust between primary and secondary pulley thrusts is kept constant.

At the time t2, according to the earlier pulley thrust control shown in FIG. 5A, the primary pulley thrust (primary-pulley-thrust command value Fpri) begins to rapidly decrease or fall. Owing to the rapid fall in the primary pulley thrust, the controlled variable of the primary pulley thrust begins to decrease.

In contrast, according to the improved pulley thrust control of the embodiment shown in FIG. 5B, on the assumption that the falling state of secondary-pulley-thrust command value Fsec is not yet stopped after secondary-pulley-thrust command value Fsec has reached slip-limit pulley thrust A, the secondary pulley thrust begins to hypothetically rise from the time t2 at which the secondary pulley thrust hypothetically reaches the calculated secondary-pulley-thrust command value Fsec (see a substantially V-shaped hypothetical change in secondary-pulley-thrust command value Fsec indicated by the broken line at a lower level than slip-limit pulley thrust A in FIG. 6B). Therefore, the difference B1 between slip-limit pulley thrust A and the desired secondary pulley thrust (secondary-pulley balance thrust F*sec or secondary-pulley-thrust command value Fsec) begins to reduce. As a result of this, the primary pulley thrust, corresponding to the sum of the difference B1 and primary-pulley-thrust command value Fpri, begins to reduce or fall from the time t2. Owing to the fall in the primary pulley thrust, the differential thrust begins to reduce.

At a point of time t3, the difference B1 between slip-limit pulley thrust A and the desired secondary pulley thrust (secondary-pulley balance thrust F*sec or secondary-pulley-thrust command value Fsec) becomes "0". During the upshift within the transmission ratio range of ip≧1, from the time t3, the routine of FIG. 3 flows from step S105 via step S106 to step S107, and then jumps from step S107 to step S200. Thus, primary-pulley-thrust command value Fpri is held at slip-limit pulley thrust A, while secondary-pulley-thrust command value Fsec is controlled in a manner so as to bring the radius of the contact circle of the drive belt of the lower-thrust pulley and the radius of the contact circle of the drive belt of the higher-thrust pulley closer to their desired radii corresponding to desired transmission ratio ip*. That is, secondary-pulley-thrust command value Fsec begins to rise from the time t3.

At a point of time t4, in both of the earlier pulley thrust control (see the α→γ upshift in FIG. 5A) and the improved pulley thrust control (see the α→γ upshift in FIG. 5B), the radius of the contact circle of the drive belt of the lower-thrust pulley and the radius of the contact circle of the drive belt of the higher-thrust pulley are brought closer to their desired radii corresponding to desired transmission ratio ip* (=γ). Thus, each of primary-pulley-thrust command value Fpri and secondary-pulley-thrust command value Fsec is kept constant. Owing to primary-pulley-thrust command value Fpri and secondary-pulley-thrust command value Fsec kept constant, in the earlier pulley thrust control shown in FIG. 5A, the controlled variable of the primary pulley thrust becomes also kept constant from the time t4. In contrast, in the improved pulley thrust control of the embodiment shown in FIG. 5B, the differential thrust between primary and secondary pulley thrusts becomes kept at "0" from the time t4.

[2-1: Comparison Between Transmission-Ratio Versus Thrust Correlation Diagrams of Earlier Pulley Thrust Control and Improved Pulley Thrust Control Within Transmission Ratio Range of ip<1]

Figure 7A:
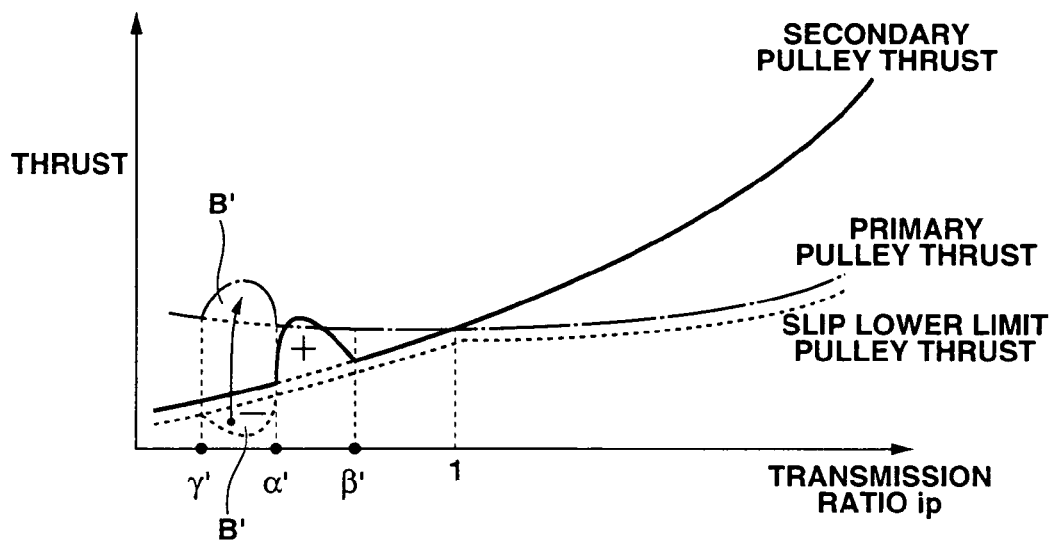
FIG. 7A is the characteristic diagram explaining the pulley thrust control executed by the earlier CVT hydraulic pressure control apparatus during a shift within a pulley-ratio range less than "1".
Figure 7B:
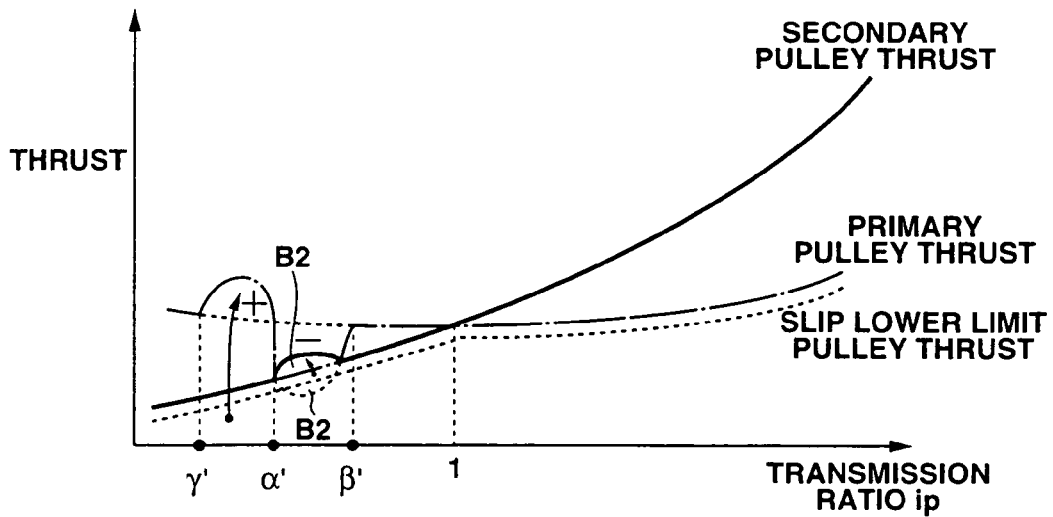
FIG. 7B is the characteristic diagram explaining the pulley thrust control executed by the CVT hydraulic pressure control apparatus of the embodiment during a shift within a pulley-ratio range less than "1".

FIGS. 7A-7B show the comparison result between the earlier pulley thrust control (see FIG. 7A) and the improved pulley thrust control (see FIG. 7B) performed by the pressure control apparatus of the embodiment, during a shift within a transmission-ratio range less than "1".

In the earlier pulley thrust control, a lower limit guard (corresponding to slip-limit pulley thrust A) for each of pulley thrusts of primary and secondary pulleys is set for belt slippage avoidance. Pulley thrust control is performed in a manner so as to ensure a differential thrust corresponding to a desired transmission ratio by building up or reducing a pulley thrust of the lower-thrust pulley during a shift. However, when a pulley-thrust command value of the lower-thrust pulley (the secondary pulley in FIG. 7A) becomes less than the slip lower limit pulley thrust (the lower limit guard), on the one hand, the lower-thrust-pulley thrust command value is held at the lower limit guard. On the other hand, in order to avoid a transient shifting responsiveness from deteriorating owing to a decrease in the time rate of change in the radius of the contact circle of the drive belt of the lower-thrust pulley, arising from holding the calculated pulley thrust at the lower limit guard and thus to ensure the shifting responsiveness, a difference (see the area B' indicated by the minus (−) sign in FIG. 7A) between the lower-thrust-pulley thrust command value and the lower limit guard is calculated and thereafter the calculated difference is added (see the arrow of FIG. 7A) to the higher-thrust-pulley thrust command value.

In contrast, in the improved pulley thrust control of the pressure control apparatus of the embodiment, during a shift within a transmission-ratio range less than "1" a lower-thrust-pulley thrust command value is basically held at slip-limit pulley thrust A (corresponding to the lower limit guard). Pulley thrust control is performed in a manner so as to ensure a differential thrust corresponding to a desired transmission ratio by building up or reducing a pulley thrust of the higher-thrust pulley and thus to bring the transmission ratio closer to the desired transmission ratio during a shift within a transmission-ratio range less than "1". However, when a thrust command value of the higher-thrust pulley (the primary pulley in FIG. 7B) becomes less than slip-limit pulley thrust A, on the one hand, the higher-thrust-pulley thrust command value is held at slip-limit pulley thrust A (or the lower limit guard). On the other hand, in order to ensure the shifting responsiveness, a difference (see the area B2 indicated by the minus (−) sign in FIG. 7B) between the higher-thrust-pulley thrust command value and slip-limit pulley thrust A is calculated and thereafter the calculated difference is added (see the arrow of FIG. 7B) to the lower-thrust-pulley thrust command value.

[During Downshift Within Transmission Ratio Range of ip<1]

When a downshift is made by increasing from a pulley ratio α' to a pulley ratio β', the radius of the contact circle of the drive belt of the primary pulley has to be contracted or decreased, while the radius of the contact circle of the drive belt of the secondary pulley has to be expanded or increased.

In the earlier pulley thrust control shown in FIG. 7A, in order to increase the radius of the contact circle of the drive belt of the lower-thrust pulley side (that is, the secondary pulley) and thus to achieve the β'→β' downshift, the secondary pulley thrust is increased (see the area indicated by the plus (+) sign in FIG. 7A). During the α'→β' downshift, the primary pulley thrust of the higher-thrust pulley side varies at high thrust levels. As can be seen from setting of primary and secondary pulley thrusts during the α'→β' downshift in FIG. 7A, primary and secondary pulley thrusts are both kept at high thrust levels. Therefore, during the downshift within the transmission ratio range of ip<1, in the earlier pulley thrust control (see the α'→β' downshift in FIG. 7A), as a whole, the CVT control system requires high hydraulic pressure, in other words, a high load carried on the engine, thus increasing the fuel consumption.

In contrast, in the improved pulley thrust control of the embodiment shown in FIG. 7B, in order to decrease the radius of the contact circle of the drive belt of the higher-thrust pulley side (that is, primary pulley 310) and thus to achieve the α'→β' downshift, the primary pulley thrust (exactly, primary-pulley balance thrust F*pri) is decreased so that the differential thrust, corresponding to the desired transmission ratio β', is ensured. During the α'→β' downshift, when the desired primary pulley thrust, corresponding to primary-pulley balance thrust F*pri or primary-pulley-thrust command value Fpri and suited for and calculated based on desired transmission ratio ip*, becomes less than slip-limit pulley thrust A (the lower limit guard), primary-pulley-thrust command value Fpri is held at slip-limit pulley thrust A, and additionally the difference B2 between slip-limit pulley thrust A and the desired primary pulley thrust (primary-pulley balance thrust F*pri) is calculated and then the difference B2 is added to secondary-pulley-thrust command value Fsec.

As discussed above, during the downshift within the transmission ratio range of ip<1, in the earlier pulley thrust control (see the α'→β' downshift in FIG. 7A), the primary and secondary pulley thrusts are both held at high thrust levels, and whereby the pressure load (the load carried on the engine to produce high hydraulic pressure) becomes high. In contrast, in the improved pulley thrust control of the embodiment (see the α'→β' downshift in FIG. 7B), during the downshift within the transmission ratio range of ip<1, the pressure load can be reduced by reducing or dropping the primary-pulley-thrust command value Fpri of the higher-thrust pulley side. When the desired primary pulley thrust (primary-pulley balance thrust F*pri) becomes less than slip-limit pulley thrust A, primary-pulley-thrust command value Fpri is held at slip-limit pulley thrust A, and additionally the difference B2 between slip-limit pulley thrust A and the desired primary pulley thrust (primary-pulley balance thrust F*pri) is added to secondary-pulley-thrust command value Fsec so as to improve and enhance the shifting responsiveness.

[During Upshift Within Transmission Ratio Range of ip<1]

When an upshift is made by decreasing from pulley ratio α' to a pulley ratio γ', the radius of the contact circle of the drive belt of the secondary pulley has to be expanded or increased, while the radius of the contact circle of the drive belt of the primary pulley has to be contracted or decreased.

In the earlier pulley thrust control shown in FIG. 5A, in order to decrease the radius of the contact circle of the drive belt of the lower-thrust pulley side (that is, the secondary pulley) and thus to achieve the α'→γ' upshift, the secondary pulley thrust is reduced (see the area B' indicated by the minus (−) sign in FIG. 7A) so that the differential thrust, corresponding to the desired transmission ratio γ', is ensured and the desired α'→γ' upshift is achieved. During the α'→γ' upshift, the secondary pulley thrust corresponding to the desired transmission ratio γ' tends to become less than slip-limit pulley thrust A (see the area B' indicated by the minus (−) sign in FIG. 7A). As clearly seen from setting of primary and secondary pulley thrusts during the α'→γ' upshift in FIG. 7A, the difference B' between the desired secondary pulley thrust (i.e., the lower-thrust-pulley thrust command value) and the lower limit guard (i.e., slip-limit pulley thrust A) is calculated and thereafter the calculated difference B' is added (see the arrow of FIG. 7A) to the primary pulley thrust of the higher-thrust pulley side.

In contrast, in the improved pulley thrust control shown in FIG. 7B, the secondary pulley thrust of the lower-thrust pulley side is held at slip-limit pulley thrust A, and thus the primary pulley thrust (exactly, primary-pulley balance thrust F*pri) is increased (see the area indicated by the plus (+) sign in FIG. 7B) in such a manner as to expand or increase the radius of the contact circle of the drive belt of primary pulley 310.

As discussed above, resultingly, during the upshift within the transmission ratio range of ip<1, in both of the earlier pulley thrust control (see the α'→γ' upshift in FIG. 7A) and the improved pulley thrust control (see the α'→γ' upshift in FIG. 7B), the secondary pulley thrust is held at slip-limit pulley thrust A (the lower limit guard), while the primary pulley thrust is increased to ensure the differential thrust of primary and secondary pulley thrusts, corresponding to desired transmission ratio ip* (=γ'), and thus to achieve the desired upshift. Therefore, during the upshift within the transmission ratio range of ip<1, in the improved pulley thrust control (see the α'→γ' upshift in FIG. 7B) as well as the earlier pulley thrust control (see the α'→γ' upshift in FIG. 7A), the CVT control system requires an increase in hydraulic pressure.

[2-2: Comparison of Time Variations of Primary and Secondary Pulley Thrusts Between Earlier Pulley Thrust Control and Improved Pulley Thrust Control Within Transmission Ratio Range of ip<1]

FIG. 8A is the time chart showing time variations in primary and secondary pulley thrusts, obtained by the earlier pulley thrust control shown in FIG. 5A during the downshift within the transmission ratio range less than "1", whereas FIG. 8B is the time chart showing time variations in primary and secondary pulley thrusts, obtained by the improved pulley thrust control of the embodiment shown in FIG. 5B during the downshift within the transmission ratio range less than "1".

At a downshift starting point t11, a downshift control is initiated. According to the earlier pulley thrust control shown in FIG. 5A, the secondary-pulley-thrust command value is controlled in such a manner as to ensure the differential thrust corresponding to the desired transmission ratio by increasing the lower-thrust-pulley thrust command value. Therefore, in order to bring the radius of the contact circle of the drive belt of the lower-thrust pulley and the radius of the contact circle of the drive belt of the higher-thrust pulley closer to their desired radii corresponding to desired transmission ratio ip*, secondary-pulley-thrust command value Fsec tends to rapidly rise, while primary-pulley-thrust command value Fpri tends to gradually fall (see variations in the primary and secondary pulley thrusts just after downshift starting point t11 in FIG. 8A).

In contrast, according to the improved pulley thrust control shown in FIG. 5B, the differential thrust, corresponding to the desired transmission ratio, is ensured by decreasing the higher-thrust-pulley thrust command value. That is, in order to achieve desired transmission ratio ip* by controlling primary-pulley-thrust command value Fpri of primary pulley 310 to which a higher pressure is applied during the downshift within the transmission ratio range less than "1", the downshift is made by reducing primary-pulley-thrust command value Fpri, while holding secondary-pulley-thrust command value Fsec of secondary pulley 320 at slip-limit pulley thrust A. Just after downshift starting point t11 in FIG. 8B, in order to bring the actual transmission ratio closer to desired transmission ratio ip*, primary-pulley-thrust command value Fpri tends to rapidly fall, and as a result the differential thrust between primary and secondary pulley thrusts rapidly reduces or falls. After this, primary-pulley-thrust command value Fpri tends to reduce to below slip-limit pulley thrust A, but the lower limit of primary-pulley-thrust command value Fpri is limited to slip-limit pulley thrust A by means of speed-change control section 160. Therefore, as soon as primary-pulley-thrust command value Fpri reaches slip-limit pulley thrust A, a fall of primary-pulley-thrust command value Fpri is stopped or inhibited.

During a time period (t11-t12) between downshift starting point t11 and a point of time t12 in FIG. 8A, according to the earlier pulley thrust control shown in FIG. 5A, the falling state of the primary pulley thrust (primary-pulley-thrust command value Fpri) is continued, while the secondary pulley thrust tends to slightly moderately decrease with the controlled variable of the secondary pulley thrust kept constant.

In contrast, according to the improved pulley thrust control of the embodiment shown in FIG. 5B, during the time period (t11-t12) in FIG. 8B, at the early stage of this time period the falling state of primary-pulley-thrust command value Fpri is quickly stopped or inhibited immediately when slip-limit pulley thrust A has been reached. As a result of this, the time rate of change in the radius of the contact circle of the drive belt of primary pulley 310 tends to decrease. At this time, assuming that secondary-pulley-thrust command value Fsec remains kept at slip-limit pulley thrust A, the downshift responsiveness is deteriorated. To avoid this, according to the improved pulley thrust control of the embodiment, the difference B2 between slip-limit pulley thrust A and the desired primary pulley thrust (primary-pulley balance thrust F*pri or primary-pulley-thrust command value Fpri) is added to secondary-pulley-thrust command value Fsec. Owing to such addition of the difference B2 to secondary-pulley-thrust command value Fsec, secondary-pulley-thrust command value Fsec begins to rise away from slip-limit pulley thrust A and the rising tendency of secondary-pulley-thrust command value Fsec continues during the time period (t11-t12). On the other hand, primary-pulley-thrust command value Fpri is held at slip-limit pulley thrust A during the time period (t11-t12). During the time period (t11-t12), the differential thrust between primary and secondary pulley thrusts is kept constant.

At the time t12, according to the earlier pulley thrust control shown in FIG. 5A, the secondary pulley thrust (secondary-pulley-thrust command value Fsec) begins to rapidly decrease or fall. Owing to the rapid fall in the secondary pulley thrust, the controlled variable of the secondary pulley thrust begins to decrease.

In contrast, according to the improved pulley thrust control of the embodiment shown in FIG. 5B, on the assumption that the falling state of primary-pulley-thrust command value Fpri is not yet stopped after primary-pulley-thrust command value Fpri has reached slip-limit pulley thrust A, the primary pulley thrust begins to hypothetically rise from the time t12 at which the primary pulley thrust hypothetically reaches the calculated primary-pulley-thrust command value Fpri (see a substantially V-shaped hypothetical change in primary-pulley-thrust command value Fpri indicated by the broken line at a lower level than slip-limit pulley thrust A in FIG. 8B). Therefore, the difference B2 between slip-limit pulley thrust A and the desired primary pulley thrust (primary-pulley balance thrust F*pri or primary-pulley-thrust command value Fpri) begins to reduce. As a result of this, the secondary pulley thrust, corresponding to the sum of the difference B2 and secondary-pulley-thrust command value Fsec, begins to reduce or fall from the time t12. Owing to the fall in the secondary pulley thrust, the differential thrust begins to reduce.

At a point of time t13, the difference B2 between slip-limit pulley thrust A and the desired primary pulley thrust (primary-pulley balance thrust F*pri or primary-pulley-thrust command value Fpri) becomes "0". During the downshift within the transmission ratio range of ip<1, from the time t13, the routine of FIG. 3 flows from step S105 via step S110 to step S111, and then jumps from step S111 to step S200. Thus, secondary-pulley-thrust command value Fsec is held at slip-limit pulley thrust A, while primary-pulley-thrust command value Fpri is controlled in a manner so as to bring the radius of the contact circle of the drive belt of the lower-thrust pulley and the radius of the contact circle of the drive belt of the higher-thrust pulley closer to their desired radii corresponding to desired transmission ratio ip*. That is, primary-pulley-thrust command value Fpri begins to rise from the time t13.

At a point of time t14, in both of the earlier pulley thrust control (see the α'→β' downshift in FIG. 7A) and the improved pulley thrust control (see the α'→β' downshift in FIG. 7B), the radius of the contact circle of the drive belt of the lower-thrust pulley and the radius of the contact circle of the drive belt of the higher-thrust pulley are brought closer to their desired radii corresponding to desired transmission ratio ip* (=β'). Thus, each of primary-pulley-thrust command value Fpri and secondary-pulley-thrust command value Fsec is kept constant. Owing to primary-pulley-thrust command value Fpri and secondary-pulley-thrust command value Fsec kept constant, in the earlier pulley thrust control shown in FIG. 5A, the controlled variable of the secondary pulley thrust becomes also kept constant from the time t14. In contrast, in the improved pulley thrust control of the embodiment shown in FIG. 5B, the differential thrust between primary and secondary pulley thrusts becomes kept at "0" from the time t14.

As will be appreciated from the above, according to the hydraulic pressure control apparatus of the automotive belt-drive continuously variable transmission of the embodiment, in order to ensure a differential thrust, corresponding to desired transmission ratio ip*, by reducing a thrust command value of the higher-thrust-pulley side to which a higher pressure is applied, during an upshift within a transmission range of ip≧1 and during a downshift within a transmission range of ip<1, the thrust command value of the higher-thrust-pulley side is reduced, while holding a thrust command value of the lower-thrust-pulley side at slip-limit pulley thrust A. Additionally, when the higher-thrust-pulley thrust command value, corresponding to desired transmission ratio ip*, becomes less than slip-limit pulley thrust A, a difference between the higher-thrust-pulley thrust command value and slip-limit pulley thrust A is calculated and thereafter the calculated difference is added to the lower-thrust-pulley thrust command value.

As set forth above, when an upshift is made within a transmission range of ip≧1 (see the variations in primary and secondary pulley thrusts shown in FIGS. 5B and 6B during the α→γ upshift), it is possible to reduce the thrust command value of the higher-thrust pulley side (secondary pulley 320) keeping the relatively higher thrust, while remaining the thrust command value of the lower-thrust pulley side (primary pulley 310) at low levels. In a similar manner, when a downshift is made within a transmission range of ip<1 (see the variations in primary and secondary pulley thrusts shown in FIGS. 7B and 8B during the α'→β' downshift), it is possible to reduce the thrust command value of the higher-thrust pulley side (primary pulley 310) keeping the relatively higher thrust, while remaining the thrust command value of the lower-thrust pulley side (secondary pulley 320) at low levels. Thus, it is possible to avoid undesirable generation of wastefully high hydraulic pressure, while preventing slippage of drive belt 330. This prevents a wastefully high load carried on engine 10 for high hydraulic pressure generation, and whereby it is possible to provide the pressure control apparatus of the automotive belt-drive continuously variable transmission capable of balancing reduced fuel consumption and enhanced drive-belt life.

Additionally, according to the pressure control apparatus of the automotive belt-drive continuously variable transmission of the embodiment, when the higher-thrust-pulley thrust command value, corresponding to desired transmission ratio ip*, becomes less than slip-limit pulley thrust A, a difference between the higher-thrust-pulley thrust command value and slip-limit pulley thrust A is calculated and thereafter the calculated difference is added to the lower-thrust-pulley thrust command value. Thus, during an upshift within a transmission range of ip≧1 (see the variations in primary and secondary pulley thrusts shown in FIGS. 5B and 6B during the α→γ upshift), and during a downshift within a transmission range of ip<1 (see the variations in primary and secondary pulley thrusts shown in FIGS. 7B and 8B during the α'→β' downshift), it is possible to achieve or timely produce the necessary minimum pulley-thrust rise in the low-thrust pulley side, even under a particular condition where the higher-thrust-pulley thrust command value is limited to or held at slip-limit pulley thrust A. The necessary minimum pulley-thrust rise in the lower-thrust pulley side ensures an enhanced transient shifting responsiveness. Thus, it is possible to provide the pressure control apparatus of the automotive belt-drive continuously variable transmission capable of balancing reduced fuel consumption (improved fuel economy) and enhanced drive-belt life, while avoiding undesirable slippage of drive belt 330.

In the pressure control apparatus of the shown embodiment, CVT control unit (CVT CU) 100 executes the pulley thrust control based on sensor signals from primary pulley speed sensor 210, secondary pulley speed sensor 220, throttle opening sensor 230, engine speed sensor 240, and vehicle speed sensor 250. Therefore, it is possible to enhance the pulley-thrust-control responsiveness, while avoiding undesirable slippage of drive belt 330.

Thrust-to-pressure conversion section 170 that constructs part of CVT CU 100, receives input information about (i) a change in hydraulic pressure in the primary pulley actuation chamber associated with primary pulley 310, arising from working fluid centrifugal effects (centrifugal force created by rotation of primary pulley 310) and a change in hydraulic pressure in the secondary pulley actuation chamber associated with secondary pulley 320, arising from working fluid centrifugal effects (centrifugal force created by rotation of secondary pulley 320), (ii) a preload of the preloading spring for primary-pulley adjustable flange 311 and a preload of the preloading spring for secondary-pulley adjustable flange 321, and/or (iii) a difference between the pressure receiving area of the primary pulley actuation chamber and the pressure receiving area of the secondary pulley actuation chamber. Thrust-to-pressure conversion section 170 converts primary-pulley-thrust command value Fpri and secondary-pulley-thrust command value Fsec into the respective pressure command values Ppri and Psec, while properly compensating for primary-pulley-thrust command value Fpri and secondary-pulley-thrust command value Fsec, based on the input information. Thereafter, information about pressure command values Ppri and Psec is output to electric-current conversion section 180. Therefore, it is possible to compensate for primary-pulley-thrust command value Fpri and secondary-pulley-thrust command value Fsec, based on the pressure receiving area of the primary pulley actuation chamber and the pressure receiving area of the secondary pulley actuation chamber, in particular, the pressure-receiving-area difference. This enhances the pulley thrust control accuracy, thus enhancing the pressure control responsiveness, that is, the shifting responsiveness.

The entire contents of Japanese Patent Application No. 2004-225965 (filed Aug. 2, 2004) are incorporated herein by reference.

While the foregoing is a description of the preferred embodiments carried out the invention, it will be understood that the invention is not limited to the particular embodiments shown and described herein, but that various changes and modifications may be made without departing from the scope or spirit of this invention as defined by the following claims.

What is claimed is:

1. A hydraulic pressure control apparatus of a belt-drive continuously variable transmission for an automotive vehicle, which employs a primary variable-width pulley of a driving pulley side, a secondary variable-width pulley of a driven pulley side, and a drive belt running in the primary and secondary pulleys, and whose shift is made by changing a radius of a contact circle of the drive belt of the driving pulley side and a radius of a contact circle of the drive belt of the driven pulley side by a primary pulley thrust, created by at least a primary pulley pressure applied to an adjustable flange of the primary pulley, and a secondary pulley thrust, created by at least a secondary pulley pressure applied to an adjustable flange of the secondary pulley, comprising:

a vehicular information detector that detects engine-and-vehicle operating conditions;

a hydraulic actuator that regulates the primary and secondary pulley pressures; and a control unit being configured to be electrically connected to the vehicular information detector and the hydraulic actuator, for calculating a command value of the primary pulley thrust and a command value of the secondary pulley thrust based on information about the engine-and-vehicle operating conditions, and for automatically controlling the hydraulic actuator responsively to the primary-pulley-thrust command value and the secondary-pulley-thrust command value; the control unit comprising a processor programmed to perform the following, (a) calculating a desired transmission ratio based on the information about the engine-and-vehicle operating conditions;

(b) calculating a primary-pulley slip-limit pulley thrust, which is defined as a lower limit of the primary pulley thrust enabling torque transmission between the primary and secondary pulleys without slippage of the drive belt, and a secondary-pulley slip-limit pulley thrust, which is defined as a lower limit of the secondary pulley thrust enabling torque transmission between the primary and secondary pulleys without slippage of the drive belt, based on the information about the engine-and-vehicle operating conditions;

(c) setting the primary-pulley-thrust command value to the primary-pulley slip-limit pulley thrust and calculating a desired secondary pulley thrust based on the desired transmission ratio, when a pulley ratio of the primary and secondary pulleys is greater than or equal to 1; and (d) setting the secondary-pulley-thrust command value to the secondary-pulley slip-limit pulley thrust and calculating a desired primary pulley thrust based on the desired transmission ratio, when the pulley ratio is less than 1.

2. The hydraulic pressure control apparatus as claimed in claim 1, wherein said processor is further programmed for:

(e) setting a command value of the secondary pulley pressure to a value substantially corresponding to the desired secondary pulley thrust, when the pulley ratio is greater than or equal to 1 and the desired secondary pulley thrust is greater than or equal to the secondary-pulley slip-limit pulley thrust;

(f) setting a sum of the primary-pulley slip-limit pulley thrust and a difference between the secondary-pulley slip-limit pulley thrust and the desired secondary pulley thrust to the primary-pulley-thrust command value, and additionally setting the secondary-pulley slip-limit pulley thrust to the secondary-pulley-thrust command value, when the pulley ratio is greater than or equal to 1 and the desired secondary pulley thrust is less than the secondary-pulley slip-limit pulley thrust;

(g) setting a command value of the primary pulley pressure to a value substantially corresponding to the desired primary pulley thrust, when the pulley ratio is less than 1 and the desired primary pulley thrust is greater than or equal to the primary-pulley slip-limit pulley thrust; and (h) setting a sum of the secondary-pulley slip-limit pulley thrust and a difference between the primary-pulley slip-limit pulley thrust and the desired primary pulley thrust to the secondary-pulley-thrust command value, and additionally setting the primary-pulley slip-limit pulley thrust to the primary-pulley-thrust command value, when the pulley ratio is less than 1 and the desired primary pulley thrust is less than the primary-pulley slip-limit pulley thrust.

3. The hydraulic pressure control apparatus as claimed in claim 1, wherein:
the vehicular information detector comprises a primary pulley speed sensor, a secondary pulley speed sensor, a throttle opening sensor, an engine speed sensor, and a vehicle speed sensor.

4. The hydraulic pressure control apparatus as claimed in claim 1, wherein said processor is further programmed for:
(i) detecting a first factor including a change in hydraulic pressure in a primary pulley actuation chamber associated with the primary pulley, arising from a working fluid centrifugal effect created by rotation of the primary pulley and a change in hydraulic pressure in a secondary pulley actuation chamber associated with the secondary pulley, arising from a working fluid centrifugal effect created by rotation of the secondary pulley, and a second factor including a spring preload applied to the primary-pulley adjustable flange and a spring preload applied to the secondary-pulley adjustable flange; and
(j) calculating a minimum primary-pulley-pressure command value and a minimum secondary-pulley-pressure command value based on the first and second factors.

5. The hydraulic pressure control apparatus as claimed in claim 1, wherein said processor is further programmed for:
(i) detecting a first factor including a change in hydraulic pressure in a primary pulley actuation chamber associated with the primary pulley, arising from a working fluid centrifugal effect created by rotation of the primary pulley and a change in hydraulic pressure in a secondary pulley actuation chamber associated with the secondary pulley, arising from a working fluid centrifugal effect created by rotation of the secondary pulley, a second factor including a spring preload applied to the primary-pulley adjustable flange and a spring preload applied to the secondary-pulley adjustable flange, and a third factor including a difference between a pulley-actuation-chamber pressure receiving area of the primary pulley and a pulley-actuation-chamber pressure receiving area of the secondary pulley; and
(k) compensating for the primary-pulley-thrust command value and the secondary-pulley-thrust command value based on at least one of the first, second, and third factors.

6. A hydraulic pressure control apparatus of a belt-drive continuously variable transmission for an automotive vehicle, which employs a primary variable-width pulley of a driving pulley side, a secondary variable-width pulley of a driven pulley side, and a drive belt running in the primary and secondary pulleys, and whose shift is made by changing a radius of a contact circle of the drive belt of the driving pulley side and a radius of a contact circle of the drive belt of the driven pulley side by a primary pulley thrust, created by at least a primary pulley pressure applied to an adjustable flange of the primary pulley, and a secondary pulley thrust, created by at least a secondary pulley pressure applied to an adjustable flange of the secondary pulley, comprising:
a vehicular information detector that detects engine-and-vehicle operating conditions;
a hydraulic actuator that regulates the primary and secondary pulley pressures; and
a control unit being configured to be electrically connected to the vehicular information detector and the hydraulic actuator, for calculating a command value of the primary pulley thrust and a command value of the secondary pulley thrust based on information about the engine-and-vehicle operating conditions, and for automatically controlling the hydraulic actuator responsively to the primary-pulley-thrust command value and the secondary-pulley-thrust command value; the control unit comprising a processor programmed to perform the following,
(a) calculating a desired transmission ratio based on the information about the engine-and-vehicle operating conditions;
(b) calculating a primary-pulley slip-limit pulley thrust, which is defined as a lower limit of the primary pulley thrust enabling torque transmission between the primary and secondary pulleys without slippage of the drive belt, and a secondary-pulley slip-limit pulley thrust, which is defined as a lower limit of the secondary pulley thrust enabling torque transmission between the primary and secondary pulleys without slippage of the drive belt, based on the information about the engine-and-vehicle operating conditions;
(c) calculating a desired secondary pulley thrust based on the desired transmission ratio within a transmission ratio range greater than or equal to 1, and setting a sum of the primary-pulley slip-limit pulley thrust and a difference between the secondary-pulley slip-limit pulley thrust and the desired secondary pulley thrust to the primary-pulley-thrust command value, and additionally setting the secondary-pulley slip-limit pulley thrust to the secondary-pulley-thrust command value, when the desired secondary pulley thrust is less than the secondary-pulley slip-limit pulley thrust during an upshift within the transmission ratio range greater than or equal to 1; and
(d) calculating a desired primary pulley thrust based on the desired transmission ratio within the transmission ratio range less than 1, and setting a sum of the secondary-pulley slip-limit pulley thrust and a difference between the primary-pulley slip-limit pulley thrust and the desired primary pulley thrust to the secondary-pulley-thrust command value, and additionally setting the primary-pulley slip-limit pulley thrust to the primary-pulley-thrust command value, when the desired primary pulley thrust is less than the primary-pulley slip-limit pulley thrust during a downshift within the transmission ratio range less than 1.

7. A hydraulic pressure control apparatus of a belt-drive continuously variable transmission for an automotive vehicle, which employs a primary variable-width pulley of a driving pulley side, a secondary variable-width pulley of a driven pulley side, and a drive belt running in the primary and secondary pulleys, and whose shift is made by changing a radius of a contact circle of the drive belt of the driving pulley side and a radius of a contact circle of the drive belt of the driven pulley side by a primary pulley thrust, created by at least a primary pulley pressure applied to an adjustable flange of the primary pulley, and a secondary pulley thrust, created by at least a secondary pulley pressure applied to an adjustable flange of the secondary pulley, comprising:

a vehicular information detector that detects engine-and-vehicle operating conditions;

a hydraulic actuator that regulates the primary and secondary pulley pressures; and a control unit being configured to be electrically connected to the vehicular information detector and the hydraulic actuator, for calculating a command value of the primary pulley thrust and a command value of the secondary pulley thrust based on information about the engine-and-vehicle operating conditions, and for automatically controlling the hydraulic actuator responsively to the primary-pulley-thrust command value and the secondary-pulley-thrust command value; the control unit comprising (a) first means for calculating a desired transmission ratio based on the information about the engine-and-vehicle operating conditions;

(b) second means for calculating a primary-pulley slip-limit pulley thrust, which is defined as a lower limit of the primary pulley thrust enabling torque transmission between the primary and secondary pulleys without slippage of the drive belt, and a secondary-pulley slip-limit pulley thrust, which is defined as a lower limit of the secondary pulley thrust enabling torque transmission between the primary and secondary pulleys without slippage of the drive belt, based on the information about the engine-and-vehicle operating conditions; and (c) third means for setting the primary-pulley-thrust command value to the primary-pulley slip-limit pulley thrust and for calculating a desired secondary pulley thrust based on the desired transmission ratio, when a pulley ratio of the primary and secondary pulleys is greater than or equal to 1, and for setting the secondary-pulley-thrust command value to the secondary-pulley slip-limit pulley thrust and for calculating a desired primary pulley thrust based on the desired transmission ratio, when the pulley ratio is less than 1.

8. The hydraulic pressure control apparatus as claimed in claim 7, wherein:

the control unit further comprises fourth means for setting a command value of the secondary pulley pressure to a value substantially corresponding to the desired secondary pulley thrust, when the pulley ratio is greater than or equal to 1 and the desired secondary pulley thrust is greater than or equal to the secondary-pulley slip-limit pulley thrust, and for setting a sum of the primary-pulley slip-limit pulley thrust and a difference between the secondary-pulley slip-limit pulley thrust and the desired secondary pulley thrust to the primary-pulley-thrust command value, and additionally setting the secondary-pulley slip-limit pulley thrust to the secondary-pulley-thrust command value, when the pulley ratio is greater than or equal to 1 and the desired secondary pulley thrust (F*sec) is less than the secondary-pulley slip-limit pulley thrust, and for setting a command value of the primary pulley pressure to a value substantially corresponding to the desired primary pulley thrust, when the pulley ratio is less than 1 and the desired primary pulley thrust is greater than or equal to the primary-pulley slip-limit pulley thrust, and for setting a sum of the secondary-pulley slip-limit pulley thrust and a difference between the primary-pulley slip-limit pulley thrust and the desired primary pulley thrust to the secondary-pulley-thrust command value, and additionally setting the primary-pulley slip-limit pulley thrust to the primary-pulley-thrust command value, when the pulley ratio is less than 1 and the desired primary pulley thrust is less than the primary-pulley slip-limit pulley thrust.

9. A method of controlling a belt-drive continuously variable transmission for an automotive vehicle, which employs a primary variable-width pulley of a driving pulley side, a secondary variable-width pulley of a driven pulley side, and a drive belt running in the primary and secondary pulleys, and whose shift is made by changing a radius of a contact circle of the drive belt of the driving pulley side and a radius of a contact circle of the drive belt of the driven pulley side by a primary pulley thrust, created by at least a primary pulley pressure applied to an adjustable flange of the primary pulley, and a secondary pulley thrust, created by at least a secondary pulley pressure applied to an adjustable flange of the secondary pulley, the method comprising:

detecting engine-and-vehicle operating conditions;

calculating a command value of the primary pulley thrust and a command value of the secondary pulley thrust based on information about the engine-and-vehicle operating conditions;

automatically regulating the primary and secondary pulley pressures responsively to the primary-pulley-thrust command value and the secondary-pulley-thrust command value;

calculating a desired transmission ratio based on the information about the engine-and-vehicle operating conditions;

calculating a primary-pulley slip-limit pulley thrust, which is defined as a lower limit of the primary pulley thrust enabling torque transmission between the primary and secondary pulleys without slippage of the drive belt, and a secondary-pulley slip-limit pulley thrust, which is defined as a lower limit of the secondary pulley thrust enabling torque transmission between the primary and secondary pulleys without slippage of the drive belt, based on the information about the engine-and-vehicle operating conditions;

setting the primary-pulley-thrust command value to the primary-pulley slip-limit pulley thrust and calculating a desired secondary pulley thrust based on the desired transmission ratio, when a pulley ratio of the primary and secondary pulleys is greater than or equal to 1; and setting the secondary-pulley-thrust command value to the secondary-pulley slip-limit pulley thrust and calculating a desired primary pulley thrust based on the desired transmission ratio, when the pulley ratio is less than 1.

10. The method as claimed in claim 9, further comprising:

setting a command value of the secondary pulley pressure to a value substantially corresponding to the desired secondary pulley thrust, when the pulley ratio is greater than or equal to 1 and the desired secondary pulley thrust is greater than or equal to the secondary-pulley slip-limit pulley thrust;

comparing the desired secondary pulley thrust with the secondary-pulley slip-limit pulley thrust;

setting a sum of the primary-pulley slip-limit pulley thrust and a difference between the secondary-pulley slip-limit pulley thrust and the desired secondary pulley thrust to the primary-pulley-thrust command value, and additionally setting the secondary-pulley slip-limit pulley thrust to the secondary-pulley-thrust command value, when the pulley ratio is greater than or equal to 1 and the desired secondary pulley thrust is less than the secondary-pulley slip-limit pulley thrust;

comparing the desired primary pulley thrust with the primary-pulley slip-limit pulley thrust;

setting a command value of the primary pulley pressure to a value substantially corresponding to the desired primary pulley thrust, when the pulley ratio is less than 1 and the desired primary pulley thrust is greater than or equal to the primary-pulley slip-limit pulley thrust; and setting a sum of the secondary-pulley slip-limit pulley thrust and a difference between the primary-pulley slip-limit pulley thrust and the desired primary pulley thrust to the secondary-pulley-thrust command value, and additionally setting the primary-pulley slip-limit pulley thrust to the primary-pulley-thrust command value, when the pulley ratio is less than 1 and the desired primary pulley thrust is less than the primary-pulley slip-limit pulley thrust.

11. The method as claimed in claim 9, further comprising:
detecting a first factor including a change in hydraulic pressure in a primary pulley actuation chamber associated with the primary pulley, arising from a working fluid centrifugal effect created by rotation of the primary pulley and a change in hydraulic pressure in a secondary pulley actuation chamber associated with the secondary pulley, arising from a working fluid centrifugal effect created by rotation of the secondary pulley, and a second factor including a spring preload applied to the primary-pulley adjustable flange and a spring preload applied to the secondary-pulley adjustable flange; and calculating a minimum primary-pulley-pressure command value and a minimum secondary-pulley-pressure command value based on the first and second factors.

12. The method as claimed in claim 9, further comprising:
detecting a first factor including a change in hydraulic pressure in a primary pulley actuation chamber associated with the primary pulley, arising from a working fluid centrifugal effect created by rotation of the primary pulley and a change in hydraulic pressure in a secondary pulley actuation chamber associated with the secondary pulley, arising from a working fluid centrifugal effect created by rotation of the secondary pulley, a second factor including a spring preload applied to the primary-pulley adjustable flange and a spring preload applied to the secondary-pulley adjustable flange, and a third factor including a difference between a pulley-actuation-chamber pressure receiving area of the primary pulley and a pulley-actuation-chamber pressure receiving area of the secondary pulley; and compensating for the primary-pulley-thrust command value and the secondary-pulley-thrust command value based on at least one of the first, second, and third factors.

13. A method of controlling a belt-drive continuously variable transmission for an automotive vehicle, which employs a primary variable-width pulley of a driving pulley side, a secondary variable-width pulley of a driven pulley side, and a drive belt running in the primary and secondary pulleys, and whose shift is made by changing a radius of a contact circle of the drive belt of the driving pulley side and a radius of a contact circle of the drive belt of the driven pulley side by a primary pulley thrust, created by at least a primary pulley pressure applied to an adjustable flange of the primary pulley, and a secondary pulley thrust, created by at least a secondary pulley pressure applied to an adjustable flange of the secondary pulley, the method comprising:

detecting engine-and-vehicle operating conditions;

calculating a command value of the primary pulley thrust and a command value of the secondary pulley thrust based on information about the engine-and-vehicle operating conditions;

automatically regulating the primary and secondary pulley pressures responsively to the primary-pulley-thrust command value and the secondary-pulley-thrust command value;

calculating a desired transmission ratio based on the information about the engine-and-vehicle operating conditions;

calculating a primary-pulley slip-limit pulley thrust, which is defined as a lower limit of the primary pulley thrust enabling torque transmission between the primary and secondary pulleys without slippage of the drive belt, and a secondary-pulley slip-limit pulley thrust, which is defined as a lower limit of the secondary pulley thrust enabling torque transmission between the primary and secondary pulleys without slippage of the drive belt, based on the information about the engine-and-vehicle operating conditions;

calculating a desired secondary pulley thrust based on the desired transmission ratio within a transmission ratio range greater than or equal to 1, and setting a sum of the primary-pulley slip-limit pulley thrust and a difference between the secondary-pulley slip-limit pulley thrust and the desired secondary pulley thrust to the primary-pulley-thrust command value, and additionally setting the secondary-pulley slip-limit pulley thrust to the secondary-pulley-thrust command value, when the desired secondary pulley thrust is less than the secondary-pulley slip-limit pulley thrust during an upshift within the transmission ratio range greater than or equal to 1; and calculating a desired primary pulley thrust based on the desired transmission ratio within the transmission ratio range less than 1, and setting a sum of the secondary-pulley slip-limit pulley thrust and a difference between the primary-pulley slip-limit pulley thrust and the desired primary pulley thrust to the secondary-pulley-thrust command value, and additionally setting the primary-pulley slip-limit pulley thrust to the primary-pulley-thrust command value, when the desired primary pulley thrust is less than the primary-pulley slip-limit pulley thrust during a downshift within the transmission ratio range less than 1.

14. The method as claimed in claim 13, further comprising:
detecting a first factor including a change in hydraulic pressure in a primary pulley actuation chamber associated with the primary pulley, arising from a working fluid centrifugal effect created by rotation of the primary pulley and a change in hydraulic pressure in a secondary pulley actuation chamber associated with the secondary pulley, arising from a working fluid centrifugal effect created by rotation of the secondary pulley, and a second factor including a spring preload applied to the primary-pulley adjustable flange and a spring preload applied to the secondary-pulley adjustable flange; and calculating a minimum primary-pulley-pressure command value and a minimum secondary-pulley-pressure command value based on the first and second factors.

15. The method as claimed in claim 13, further comprising:
detecting a first factor including a change in hydraulic pressure in a primary pulley actuation chamber associated with the primary pulley, arising from a working fluid centrifugal effect created by rotation of the primary pulley and a change in hydraulic pressure in a secondary pulley actuation chamber associated with the secondary pulley, arising from a working fluid centrifugal effect created by rotation of the secondary pulley, a second factor including a spring preload applied to the primary-pulley adjustable flange and a spring preload applied to the secondary-pulley adjustable flange, and a third factor including a difference between a pulley-actuation-chamber pressure receiving area of the primary pulley and a pulley-actuation-chamber pressure receiving area of the secondary pulley; and compensating for the primary-pulley-thrust command value and the secondary-pulley-thrust command value based on at least one of the first, second, and third factors.

* * * * *